US008160781B2

(12) United States Patent
Naono et al.

(10) Patent No.: US 8,160,781 B2
(45) Date of Patent: Apr. 17, 2012

(54) VEHICULAR CONTROL SYSTEM AND CONTROL METHOD

(75) Inventors: Ken Naono, Tachikawa (JP); Masaaki Shimizu, Mitaka (JP); Fumio Arakawa, Kodaira (JP); Nobuyasu Kanekawa, Hitachi (JP); Kohei Sakurai, Hitachi (JP); Masatoshi Hoshino, Tsuchiura (JP); Kentaro Yoshimura, Paris (FR)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/072,494

(22) Filed: Mar. 7, 2005

(65) Prior Publication Data
US 2005/0267663 A1    Dec. 1, 2005

(30) Foreign Application Priority Data

May 27, 2004    (JP) .................................. 2004-157295

(51) Int. Cl.
*B62D 6/00*    (2006.01)
(52) U.S. Cl. ................ 701/48; 701/29; 701/36; 701/37; 701/40; 701/51; 701/55; 701/56; 701/59; 701/65; 701/99; 307/10.1
(58) Field of Classification Search .................... 701/48, 701/36, 32; 307/10.3; 340/5.61
See application file for complete search history.

(56) References Cited

U.S. PATENT DOCUMENTS

| 4,577,718 | A |   | 3/1986  | Ueno |
|-----------|---|---|---------|------|
| 5,369,584 | A | * | 11/1994 | Kajiwara ........................ 701/48 |
| 5,483,446 | A |   | 1/1996  | Momose et al. |
| 5,485,892 | A | * | 1/1996  | Fujita ............................. 180/167 |
| 5,631,501 | A | * | 5/1997  | Kubota et al. ................. 307/10.5 |
| 5,648,898 | A | * | 7/1997  | Moore-McKee et al. ....... 700/86 |
| 5,991,669 | A | * | 11/1999 | Dominke et al. ................. 701/1 |
| 6,038,505 | A | * | 3/2000  | Probst et al. .................... 701/65 |
| 6,092,006 | A | * | 7/2000  | Dominke et al. ................. 701/1 |
| 6,098,007 | A | * | 8/2000  | Fritz ............................... 701/93 |
| 6,154,688 | A | * | 11/2000 | Dominke et al. ................. 701/1 |
| 6,154,694 | A | * | 11/2000 | Aoki et al. ...................... 701/35 |

(Continued)

FOREIGN PATENT DOCUMENTS

DE    44 28 351 A1    2/1995

(Continued)

OTHER PUBLICATIONS

IPSJ Magazine vol. 44 No. 4 Apr. 2003 pp. 363-368.

*Primary Examiner* — Jonathan M Dager
(74) *Attorney, Agent, or Firm* — Antonelli, Terry, Stout & Kraus, LLP.

(57) ABSTRACT

A vehicular control system which includes a user parameter input module, an external parameter input module, a plurality of objective functions, a policy setting module, and a policy node. The user parameter input module Inputs a user parameter. The external parameter input module inputs an external parameter resulting from an outside environment. The objective functions are set for each control characteristic, respectively, so as to calculate an internal parameter of each control target from the user parameter and the external parameter. The policy setting module sets policies indicating a control index of the user for the objective functions respectively. The policy node weights the objective functions on the basis of the policies, adjusts the internal parameter in accordance with the policy so that the internal parameter is optimized among the objective functions, and issues a command to a control node corresponding to the internal parameter.

19 Claims, 14 Drawing Sheets

U.S. PATENT DOCUMENTS

| | | | |
|---|---|---|---|
| 6,161,071 A * | 12/2000 | Shuman et al. ............... 701/48 |
| 6,188,945 B1 | 2/2001 | Graf et al. |
| 6,198,996 B1 * | 3/2001 | Berstis ........................... 701/36 |
| 6,240,357 B1 | 5/2001 | Bastian |
| 6,263,262 B1 * | 7/2001 | Bitzer et al. .................... 701/1 |
| 6,292,741 B1 * | 9/2001 | Bitzer et al. .................. 701/115 |
| 6,741,920 B1 * | 5/2004 | Otto ............................... 701/49 |
| 6,836,705 B2 | 12/2004 | Hellmann et al. |
| 6,961,625 B2 | 11/2005 | Kamihira |
| 7,212,896 B2 * | 5/2007 | Coelingh et al. ............... 701/48 |
| 7,308,351 B2 * | 12/2007 | Knoop et al. ................... 701/70 |
| 7,580,820 B2 * | 8/2009 | Sawada ........................... 703/8 |
| 2002/0016659 A1 * | 2/2002 | Tashiro et al. .................. 701/48 |
| 2002/0065594 A1 * | 5/2002 | Squires et al. .................. 701/48 |
| 2002/0107106 A1 | 8/2002 | Kato et al. |
| 2002/0143451 A1 * | 10/2002 | Hac et al. ....................... 701/48 |
| 2002/0156561 A1 * | 10/2002 | DeBoni ........................... 701/48 |
| 2002/0183911 A1 * | 12/2002 | Tashiro et al. .................. 701/48 |
| 2003/0171865 A1 * | 9/2003 | Moser et al. .................... 701/48 |
| 2003/0200016 A1 * | 10/2003 | Spillane et al. ................. 701/36 |
| 2003/0225494 A1 * | 12/2003 | Coelingh et al. ............... 701/48 |
| 2004/0176880 A1 * | 9/2004 | Obradovich et al. ............ 701/1 |
| 2004/0249533 A1 * | 12/2004 | Wheals et al. .................. 701/36 |
| 2005/0209742 A1 * | 9/2005 | Sakakibara et al. ............. 701/1 |
| 2006/0006990 A1 * | 1/2006 | Obradovich ................... 340/439 |

FOREIGN PATENT DOCUMENTS

| | | |
|---|---|---|
| EP | 0 901 055 A | 3/1999 |
| EP | 1 148 394 A2 | 10/2001 |
| JP | 06-342302 | 12/1994 |
| JP | 10-089121 | 4/1998 |
| JP | 2002-225590 | 8/2001 |
| JP | 2003-065135 | 3/2003 |
| JP | 2003-191774 | 7/2003 |
| WO | WO 01/79947 A1 | 10/2001 |
| WO | PCT/GB02/02705 * | 6/2002 |

* cited by examiner

| INPUT/OUTPUT | | OBJECTIVE FUNCTIONS | F1 CONTROL-LABILITY | F2 AFTER-SAFETY | F3 MILEAGE | F4 EXHAUST EMISSION PERFORMANCE | F5 TRANQUILITY | F6 DRIVING COMFORT |
|---|---|---|---|---|---|---|---|---|
| INPUT | UCP=USERS'CRITICAL PARAMETER (INFORMATION ACQUISITION SOURCE) | | | | | | | |
| | ACCELERATING AMOUNT (ACCELERATOR PEDAL SENSOR) | UCP-1 | O | | O | O | O | O |
| | BRAKING AMOUNT(BRAKE PEDAL SENSOR) | UCP-2 | O | | O | O | O | O |
| | SHIFT VALUE (SHIFT LEVER) | UCP-3 | O | | O | O | O | O |
| | STEERING ANGLE(STEERING WHEEL SENSOR) | UCP-4 | O | | | | | |
| | XCP = EXTERNAL CRITICAL PARAMETER (INFORMATION ACQUISITION SOURCE) | | | | | | | |
| | DISTANCE TO PRECEDING VEHICLE (MILLIMETER WAVE RADAR) | XCP-1 | O | O | | | | O |
| | WHEEL SPEED (WHEEL SPEED SENSOR) | XCP-2 | O | O | O | O | O | O |
| | OUTSIDE AIR TEMPERATURE (AIR TEMPERATURE SENSOR, ROAD TRAFFIC INFORMATION SYSTEM) | XCP-3 | | | O | O | | |
| | OUTSIDE WIND SPEED (WIND SPEED SENSOR, ROAD TRAFFIC INFORMATION SYSTEM) | XCP-4 | O | | | | | O |
| | ROAD SURFACE RESISTANCE (ROAD SURFACE SENSOR, ROAD TRAFFIC INFORMATION SYSTEM) | XCP-5 | O | | O | | O | O |
| | ROAD SURFACE ASCENDING/DESCENDING ANGLE (ON-BOARD CAMERA, ROAD TRAFFIC INFORMATION SYSTEM) | XCP-6 | O | | O | O | | O |
| | ROAD MEANDER DEGREE R (ON-BOARD CAMERA, ROAD TRAFFIC INFORMATION SYSTEM) | XCP-7 | O | O | O | | O | O |
| | TRAFFIC VOLUME, TRAFFIC CONGESTION DEGREE (NAVIGATION SYSTEM, ROAD TRAFFIC INFORMATION SYSTEM) | XCP-8 | O | | O | | | |
| | SPEED LIMIT (NAVIGATION SYSTEM, ROAD TRAFFIC INFORMATION SYSTEM) | XCP-9 | O | | O | O | | |
| | DISPLACEMENT LIMIT (NAVIGATION SYSTEM, ROAD TRAFFIC INFORMATION SYSTEM) | XCP-10 | O | | O | O | | |
| | NOISE LEVEL LIMIT (NAVIGATION SYSTEM, ROAD TRAFFIC INFORMATION SYSTEM) | XCP-11 | O | | O | | O | |

*FIG.4A*

| INPUT/OUTPUT | | OBJECTIVE FUNCTIONS | F1 CONTROL-LABILITY | F2 AFTER-SAFETY | F3 MILEAGE | F4 EXHAUST EMISSION PERFORMANCE | F5 TRANQUILITY | F6 DRIVING COMFORT |
|---|---|---|---|---|---|---|---|---|
| OUTPUT | ICP = INTERNAL CRITICAL PARAMETER (CONTROL TARGET SYSTEM DESIGNATION) | | | | | | | |
| | ENGINE SPEED (ENGINE CONTROL SYSTEM) | ICP-1 | O | | O | O | O | O |
| | ENGINE INTAKE AIR AMOUNT (ELECTRONIC THROTTLE CONTROL SYSTEM) | ICP-2 | O | | O | O | O | O |
| | ENGINE FUEL INJECTION AMOUNT (ENGINE CONTROL SYSTEM) | ICP-3 | O | | O | O | O | O |
| | CHANGE GEAR RATIO (TRANSMISSION CONTROL SYSTEM) | ICP-4 | O | | O | O | O | O |
| | FRONT-WHEEL STEERING ANGLE (POWER STEERING CONTROL SYSTEM) | ICP-5 | O | | | | | O |
| | REAR-WHEEL STEERING ANGLE (POWER STEERING CONTROL SYSTEM) | ICP-6 | O | | | | | O |
| | FRONT-WHEEL STEERING ANGLE POWER STEERING OIL PRESSURE (POWER STEERING CONTROL SYSTEM) | ICP-7 | O | | | | | O |
| | REAR-WHEEL STEERING ANGLE POWER STEERING OIL PRESSURE (POWER STEERING CONTROL SYSTEM) | ICP-8 | O | | | | | O |
| | FOUR-WHEEL DRIVING FORCE DISTRIBUTION (4WD CONTROL SYSTEM) | ICP-9 | O | | O | | | O |
| | BRAKE PUMP OIL PRESSURE (ABS) | ICP-10 | O | | | | | O |
| | SUSPENSION LENGTH (SUSPENSION CONTROL SYSTEM) | ICP-11 | O | O | O | | O | O |
| | SUSPENSION SPRING CONSTANT (SUSPENSION CONTROL SYSTEM) | ICP-12 | O | O | O | | O | O |
| | SUSPENSION DAMPING COEFFICIENT (SUSPENSION CONTROL SYSTEM) | ICP-13 | | O | O | | O | O |
| | AIR BAG AIR INJECTION AMOUNT (AIR BAG CONTROL SYSTEM) | ICP-14 | | O | | | | |

FIG.4B

VEHICULAR CONTROL SYSTEM AND CONTROL METHOD

CLAIM OF PRIORITY

The present application claims priority from Japanese application P2004-157295 filed on May 27, 2004, the content of which is hereby incorporated by reference into this application.

BACKGROUND

This invention relates to tuning of parameters of a control system in which a plurality of control nodes are worked in association with one another, and, more particularly, relates to an improvement in a vehicular control system.

In recent years, each of a large number of vehicle components is mounted with a microcomputer for control (i.e., an electronic control unit, which will be referred to as an ECU hereinafter) and is operated by pieces of software installed in the ECU (as disclosed in, for example, "Development Strategy in Software Installed in Vehicle" attributed to Kenji Suganuma and Hiroyuki Murayama, on pages 363 to 368 of Vol. 44 No. 4 of Information Processing which was published by Information Processing Society of Japan in April, 2003). Although the ECU operates by itself in many cases today, it has been demanded to allow a plurality of ECU's to organically work in association with one another to bring more sophisticated operations to realization. For instance, when a driver of a vehicle wants to go round a curve at the highest possible speed, he or she demands to apply driving forces to outer wheels and small braking forces to inner wheels while shifting the load of the vehicle inwards by means of a suspension control system.

To actualize more sophisticated functions, a vehicle performs various operations with the aid of several tens of or even a hundred ECU's. For example, the vehicle makes use of an antilock brake system (ABS), an air bag, an engine control as a measure responsive to emission regulations enacted in various countries, an engine control for achieving a more favorable mileage, a suspension control for suppressing shakiness in running round a curve, and the like.

The sophisticated controls as mentioned above are performed in association with a plurality of ECU's. Known as a target driving force control is, for example, to optimally control a driving torque by accelerating or decelerating a vehicle without causing a sense of discomfort to its passengers through coordination of an engine control unit, a variable-speed control unit, and the like (as disclosed in, for example, JP 2002-225590 A).

Further, a feedback apparatus for adjusting parameters of a control target is known as a unit for making an optimal gain adjustment for a plurality of control systems (as disclosed in, for example, JP 2003-65135 A).

Still further, it is also known to hierarchize a software configuration in an apparatus for synthetically controlling a plurality of actuators of a vehicle on the basis of information on a driver's operation, a state of the vehicle, information on an environment, and the like, optimize the hierarchized configuration, and thus reduce the man-hour required in the development of software (as disclosed in, for example, JP 2003-191774 A).

SUMMARY

In the aforementioned respective conventional examples, however, if a more sophisticated operation is required, a problem is caused in that the operation of adjusting parameters of individual pieces of software for controlling the ECU's is enormous. Furthermore, the values of the parameters cannot be flexibly changed according to a user's state of utilization (an intention to drive, a driver's taste, or a driving environment). Therefore, there is a problem in that it is difficult to efficiently perform the controls according to the intention to drive, the driver's taste, or ambient road conditions.

For instance, the emission amount of NOx gas and the mileage of a vehicle are related to each other in a trade-off manner. In a situation where the traffic is heavy, the vehicle has a low mileage as a rule and is therefore desired to run with a reduced emission amount of NOx gas. In contrast, in a situation where the traffic is light, the vehicle demonstrates a small emission amount of NOx gas as a rule and is therefore desired to run in favor of mileage. However, present-day vehicles cannot be driven depending on such situations. If the realization of this situation-dependent driving is attempted, an immense cost is indispensable in adjusting the parameters of the ECU's.

In other words, it is not sufficient that the pieces of software for controlling individual equipments adjust the parameters independently. For example, since the regulation of exhaust gas emission and the enhancement of mileage are contradictory to each other, it is desirable to adjust the parameters with due consideration for both of them. Thus, the man-hour required in tuning the parameters of software tends to increase as the functions sought after become sophisticated.

Moreover, the operability (responsiveness) of the vehicle is related to the driving comfort of passengers in a trade-off manner. It is preferable to perform controls depending on the situation, for example, to prioritize a driving mode with a minimized number of high-speed turns (sharp turns) or sudden starts when there is a fellow passenger and to prioritize responsiveness when a driver as the sole occupant wishes to reach a destination as soon as possible. In the aforementioned conventional examples, however, there is a problem in that the controls cannot be easily performed in compliance with the driver's intention or the like.

In the aforementioned conventional examples, it is known to switch the parameters to be changed by the driver step by step according to each system. In an automatic transmission (driving force control system), for example, it is well known to change over between an economy mode in which a relatively high gear ratio is set to improve mileage and a power mode in which the accelerating performance or the intensity of engine braking is enhanced, through an operation of the driver. In a suspension control system, it is well known to make the magnitude of a damping force of a damper or a spring rate variable through an operation of the driver.

In switching the parameters according to the above-mentioned conventional examples, however, while it is possible to independently set a control characteristic desired by the driver for each of systems, the driver needs to take account of a balance among the systems. Thus, there is a problem in that even a driver knowledgeable about vehicles cannot easily find parameters optimizing a balance among the systems for a driving intention (or taste).

It is therefore an object of this invention, which has been made in terms of the problems mentioned above, to cause a plurality of control nodes (ECU's) to perform controls organically through the automatic tuning of control parameters of the control nodes, and as a result, to cause a vehicle to run in a sophisticated manner in conformity with outside circumstances and in accordance with a user's preference.

This invention provides a control system, comprising a plurality of control nodes connected to a network and control targets respectively controlled by the control nodes, for controlling each of the control targets in association with the plurality of control nodes, the control system comprising: a user parameter input module that inputs a user parameter corresponding to an operation of a user; an external parameter input module that inputs an external parameter resulting from an outside environment; a plurality of objective functions that are respectively set for each control characteristic and calculate an internal parameter of each of the control targets from the user parameter and the external parameter; a policy setting module that sets policies indicating a control index for the objective functions respectively; a parameter adjusting module that weights the objective functions based on the policies and adjusts the internal parameter in accordance with the policies to optimize the internal parameter among the objective functions; and an output module that issues, as a command, the internal parameter obtained in the parameter adjusting module to that one of the control nodes which corresponds to the internal parameter.

Thus, the assignment of the user parameter and the external parameter to the objective functions makes it possible to automatically adjust the internal parameter optimized among the objective functions after having weighted the objective functions on the basis of the policies.

Therefore, by inputting policies about driving, this invention makes it possible to carry out the complicated setting of parameters of a plurality of control nodes working together, and as a result, to easily cause the vehicle to run according to the user's preference. This invention also makes it possible to automatically tune the internal parameter satisfying both the conditions in a balanced manner for a plurality of objective functions.

BRIEF DESCRIPTION OF THE DRAWINGS

FIG. 4A is a combination table showing a relationship among a user parameter UCP, an external parameter XCP, and an objective function F.

FIG. 4B is a combination table showing a relationship among an internal parameter ICP, and an objective function F.

DETAILED DESCRIPTION OF PREFERRED EMBODIMENT

One embodiment of this invention will be described hereinafter with reference to the accompanying drawings.

Figure 1:
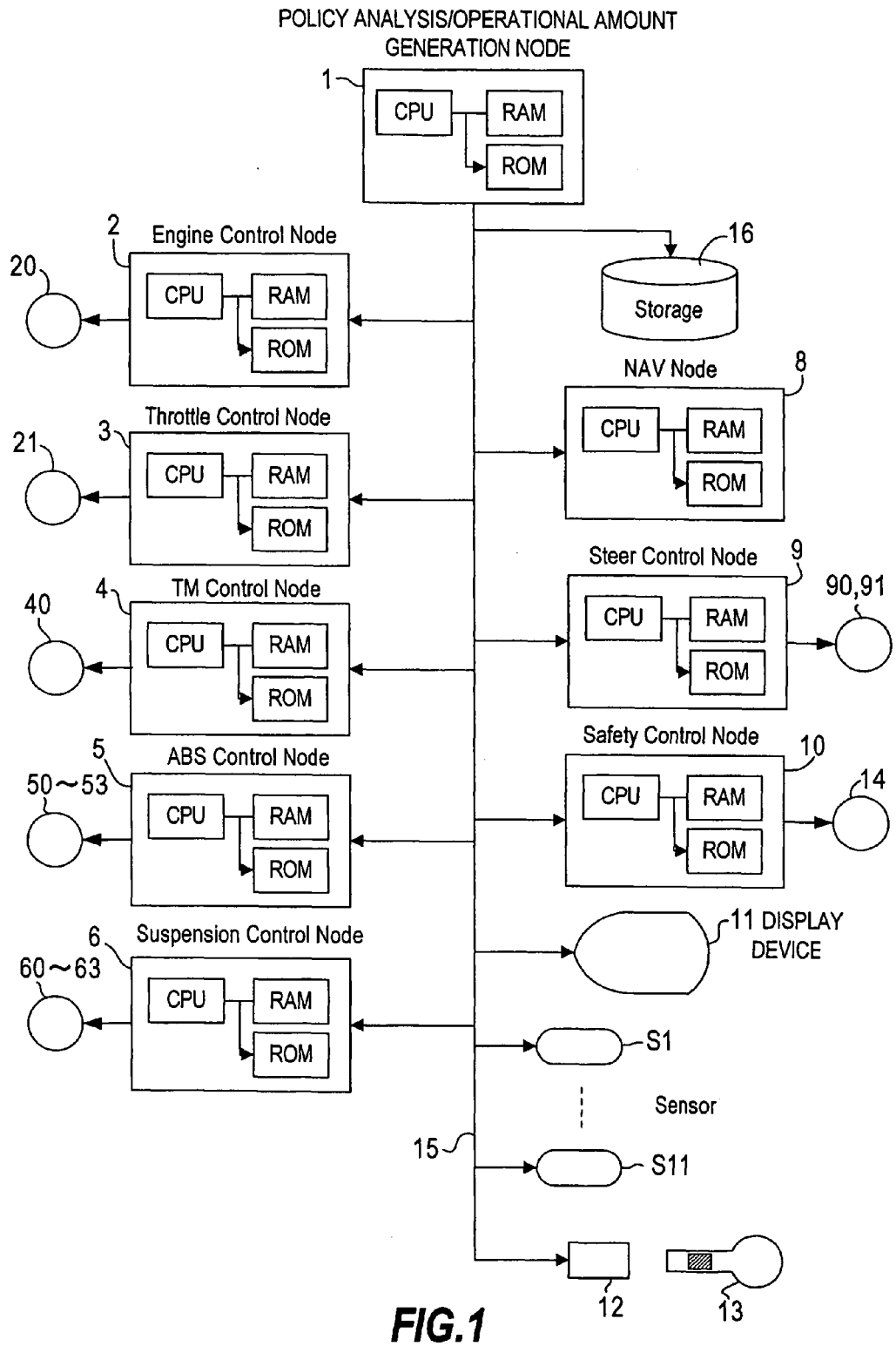
FIG. 1 is a block diagram showing a vehicular control system according to one embodiment of this invention.
Figure 2:
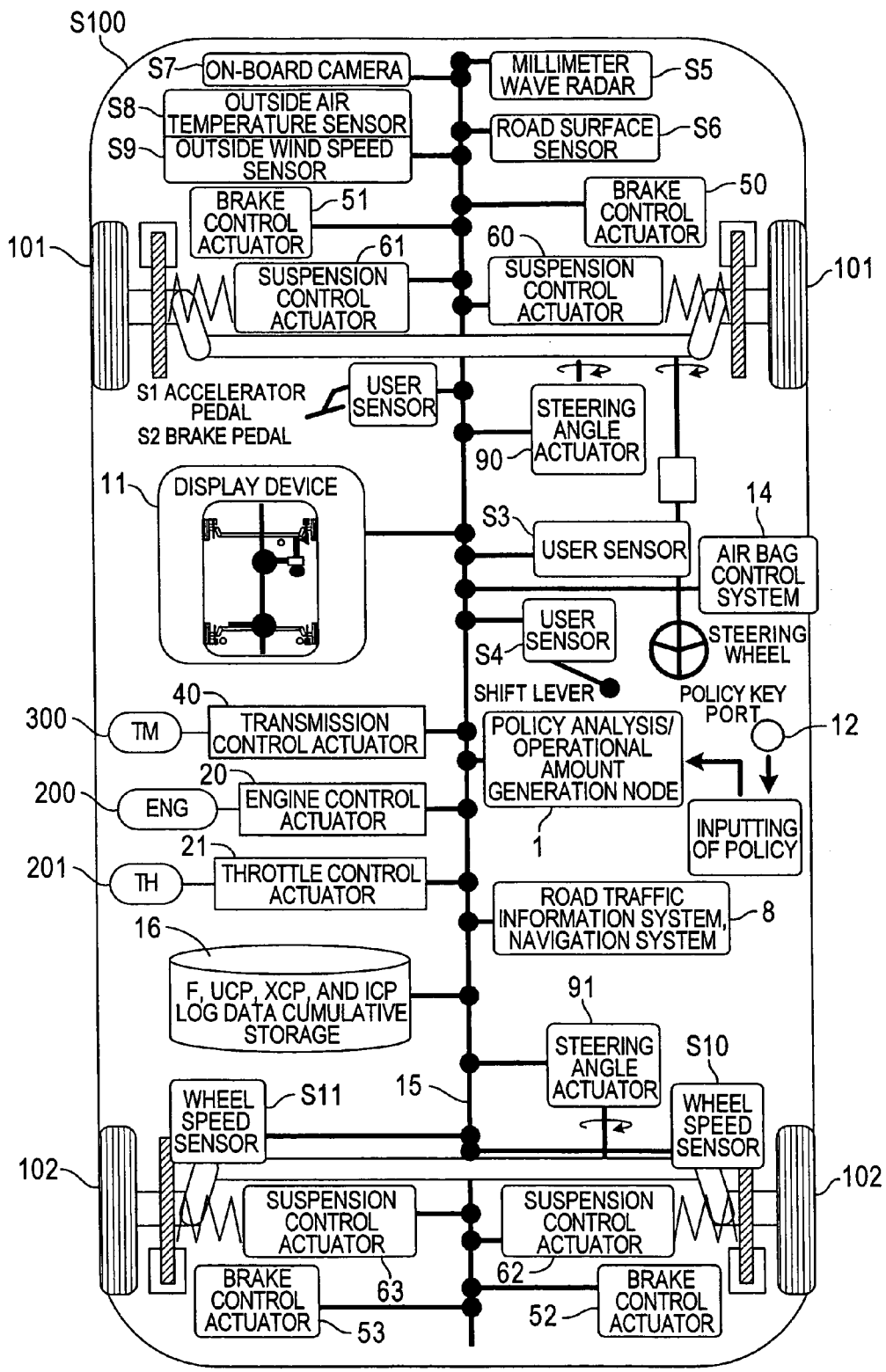
FIG. 2 is also a block diagram showing control targets and sensors of a vehicle.

FIG. 1 is a block diagram showing respective control systems of a vehicle according to one example in which this invention is applied to the vehicle. FIG. 2 is a block diagram showing the constructions of respective components of the vehicle.

Referring to FIGS. 1 and 2, a vehicle 100 is mounted with an engine control node 2 for controlling an engine 200, a throttle control node 3 for controlling an electronic throttle module 201 (Drive by Wire system), a transmission control node 4 for controlling a transmission 300, an antilock brake system (ABS) control node 5 for preventing wheels from being locked, a suspension control node 6 for controlling a suspension system, a navigation node (navigation system) 8 for detecting a position of the vehicle and a running environment of the vehicle by means of a global positioning system (GPS) or the like and displaying them on a display device 11, a steering control node 9 for controlling steering angles of front wheels 101 and rear wheels 102 respectively according to a driving state, and a safety management node 10 for controlling an air bag 14 and the like to ensure safety from collision.

Each of those control nodes is constructed as an electronic control unit (ECU) including a CPU, a RAM, and a ROM, and is connected to a policy analysis/operational amount generation node (hereinafter referred to as the policy node) 1 via a network (e.g., CAN=controller area network) 15.

The policy node 1 calculates an operational amount command value corresponding to a driving state so as to match a policy (index) set by a driver, and issues a command to each of the control nodes. Each of the aforementioned control nodes controls respective components (an actuator and the like) on the basis of the operational amount command value received from the policy node 1, and makes a driving state of the vehicle 100 coincident with the policy desired by the driver.

In other words, the policy node 1 functions as a superordinate ECU that synthetically controls the ECU's of the respective control nodes on the basis of the policy desired by the driver, and the ECU's of the respective control nodes function as subordinate ECU's that operate in tandem under the policy node 1.

Various sensors for detecting a driving state of the vehicle 100 are connected to the policy node 1 via the network 15. Those sensors are broadly classified into user sensors for detecting an operational state of the driver, sensors for detecting a running state of the vehicle 100, and sensors for detecting a running environment of the vehicle 100.

As shown in FIG. 2, disposed as the user sensors are an accelerator operational amount sensor S1 for detecting an accelerating or decelerating operation on the basis of a depression amount of an accelerator pedal or the like, a brake operation amount sensor S2 for detecting a braking or decelerating operation on the basis of a depression amount of a brake pedal or the like, a steering angle sensor S3 for detecting a steering angle of a steering wheel, and a shift position sensor S4 for detecting a shift mode or a position of a shift lever.

As shown in FIG. 2, disposed as the sensors for detecting a running state of the vehicle 100 are wheel speed sensors S10 and S11 for detecting speeds of wheels, an acceleration sensor (not shown) for detecting a longitudinal or lateral acceleration of a vehicle body, and the like.

As shown in FIG. 2, disposed as the sensors for detecting a running environment of the vehicle 100 are a millimeter wave radar S5 for detecting a distance to a preceding vehicle or an obstacle, a road surface sensor S6 for detecting a road state (road surface resistance or the like) such as an unpaved road, an ice-covered road, a dry road, or a wet road, an on-board camera S7 for sensing an ambient environment (road surface gradient and road surface curvature) by photographing an image in front of the vehicle, an outside air temperature sensor S8 for detecting a temperature of outside air, a wind speed sensor S9 for detecting a wind speed outside of the vehicle, and the like.

The navigation node 8 may not only detect a running environment and input it to the policy node 1 but also detect statutable and other running conditions including a speed limit of a road followed by the vehicle and regulation values for noise and exhaust gas emission on the basis of map information and input them to the policy node 1. Further, the navigation node 8 can acquire an ambient traffic situation (traffic congestion information and regulation information) as a running environment through radio communication or the like, acquire a road type (general road or express highway) corresponding to a current position as a running environment, and input them to the policy node 1. The map information may be stored in a storage device 16 or be acquired, as needed, from a data center or the like through radio communication or the like.

A reader-writer 12, by which data stored or to be stored in an ignition key (policy key) 13 shown in FIG. 1 are read or written, is connected to the network 15. This reader-writer 12 is disposed in a keyhole of the vehicle. As will be described later, the policy data proper to the driver are stored in the ignition key 13. When the ignition key 13 is inserted, the policy node 1 reads the policy data, which can be set as a policy of the driver. When the policy is changed in the vehicle 100, policy data are written into the ignition key 13, whereby the policy data proper to the driver can be saved.

The display device 11 is not only connected to the network 15 to display information obtained from the navigation node 8 or the policy node 1 but also provided with an input module such as a touch panel to input a policy as will be described later or perform other operations.

After having received information inputted from the various sensors as mentioned above and the policy data inputted from the ignition key 13 and the like, the policy node 1 tunes the operational amounts of the driver (user parameters) obtained from the aforementioned user sensors, external parameters based on the running state and running environment of the vehicle 100, and internal parameters (operational command values) of the respective control nodes to objective functions stored in the storage device 16 on the basis of the policy data as will be described later. Then, the policy node 1 calculates the operational amount command values and issues commands to the respective control nodes.

As will be described later, the policy node 1 calculates an internal parameter coincident with the policy as a result of the tuning, and issues a command to each of the control nodes.

Referring to FIGS. 1 and 2, an example of the control performed in each of the control nodes will now be described.

Referring to FIG. 2, although the respective control nodes are omitted for the sake of simplicity, they are connected to the policy node 1 and the components to be controlled as illustrated in FIG. 1.

1. Engine Control Node

The engine control node 2 controls an output of the engine 200 via an engine control actuator 20. If the engine control actuator 20 is constructed as, for example, a fuel injection valve, the engine control node 2 calculates a fuel injection amount with the aid of a piece of software prestored in the ROM and controls an open-valve period.

When the policy node 1 issues a command as to a target driving force (or a target torque) and a throttle opening to the engine control node 2, the engine control node 2 calculates a fuel injection amount as an internal parameter according to an engine speed detected from a crank angle sensor (not shown), the received target driving force, and the received target throttle opening, and controls the engine control actuator 20 as described above.

It is also appropriate that the policy node 1 issue a command as to a fuel injection amount to the engine control node 2.

2. Throttle Control Node

The throttle control node 3 drives a throttle control actuator 21 composed of a servomotor and the like with the aid of a piece of software prestored in the ROM, and controls an opening of the electronic throttle module 201 to a throttle opening corresponding to a command issued by the policy node 1.

It is also appropriate that the policy node 1 issue a command as to an intake air volume to the throttle control node 3. In this case, the throttle control node 3 may calculate a throttle opening on the basis of an engine speed and a value detected by an airflow meter (not shown) with the aid of a piece of software prestored in the ROM, and drive the throttle control actuator 21. The engine speed to be detected may be read directly from the crank angle sensor (not shown) of the engine 200 or received from the engine control node 2 or the policy node 1.

3. Transmission Control Node

The transmission control node 4 drives a transmission control actuator 40 composed of a stepping motor, a duty solenoid valve, and the like with the aid of a piece of software prestored in the ROM, and control the transmission 300 to a gear ratio (or a target input shaft rotational speed) corresponding to a command issued by the policy node 1.

When the policy node 1 issues a command as to a target driving force, the transmission control node 4 may calculate a target gear ratio or a target Input shaft rotational speed on the basis of an input from the engine 200 and a vehicle speed (outputs of the wheel speed sensors), and drive the transmission control actuator 40.

4. ABS Control Node

An ABS control node 5 drives brake control actuators 50 to 53 composed of hydraulic control valves and the like with the aid of a piece of software prestored in the ROM, and performs control to obtain a slip ratio or braking force corresponding to a command issued by the policy node 1 in each of the wheels.

The braking force control performed for the respective wheels independently is what is called stability control, according to which the yaw rate or the like of the vehicle is controlled to prevent the vehicle from developing an excessive oversteering or understeering tendency.

5. Suspension Control Node

The suspension control node 6 drives suspension control actuators 60 to 63 composed of fluid pressure control valves and the like with the aid of a piece of software prestored in the ROM, and performs control to obtain a damping force of a damper, a spring constant, and a vehicle height corresponding to a command issued by the policy node 1.

The policy node 1 commands the suspension control node 6 to change the damping force or the spring constant according to a change in the road surface state detected by the road surface sensor S6, to increase the damping force and the spring constant when a policy for increasing the responsiveness of the vehicle body is set, and alternatively, to reduce the damping force and the spring constant when a policy for increasing driving comfort is set.

Further, with a view to suppressing nose dive during braking or squat during acceleration, the policy node 1 performs control to maintain the posture of the vehicle body by changing command values regarding the damping force and the spring constant for the respective wheels individually.

6. Steering Control Node

The steering control node 9 drives steering angle actuators 90 and 91 composed of motors and the like with the aid of a piece of software prestored in the ROM, and performs control to obtain a steering angle corresponding to a command issued by the policy node 1.

The policy node 1 issues a command to make the steering angle of the front wheels and the steering angle of the rear wheels reverse in phase to each other so as to ensure the quick rising of the yaw rate with the intention of achieving an improvement in turning performance when a policy for increasing the responsiveness of the vehicle body is set, and alternatively, to make the steering angle of the front wheels and the steering angle of the rear wheels equal in phase to each other so as to ensure the gentle rising of the yaw rate when a policy for increasing driving comfort is set.

7. Safety Management Node

Upon the issuance of an operational command from the policy node 1, the safety management node 10 controls the air bag 14 including a fluid pressure control valve and the like with the aid of a piece of software prestored in the ROM, and thus expands the air bag to protect passengers.

The control performed in each control node is merely an example and should not be limited as described above.

Further, if the vehicle 100 is a four-wheel drive vehicle, a driving force distribution mechanism (not shown) for changing a driving force distribution ratio between the front and rear wheels 101 and 102 may be provided to change the driving forces applied to the front and rear wheels 101 and 102 according to a running condition and a road surface state. In this case, a driving force distribution control node (not shown) for controlling the driving force distribution mechanism may be provided to receive an operational amount command value from the policy node 1 and perform driving force distribution control.

<Ignition Key>

Figure 3:
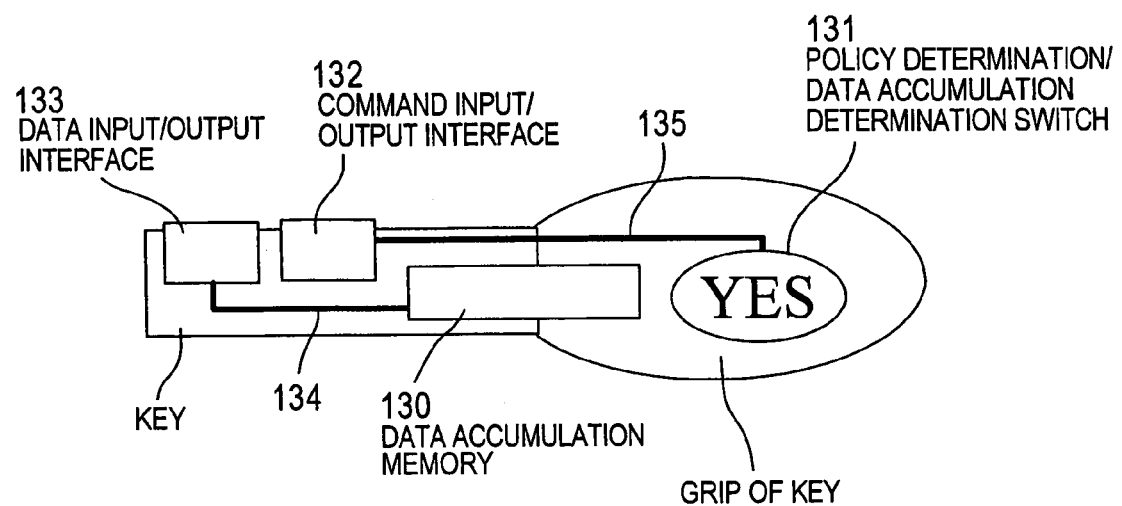
FIG. 3 is a block diagram showing the construction of an ignition key.

Referring now to FIG. 3, the construction of the ignition key 13, in which a policy as a driving index of each driver can be stored, will be described.

The ignition key 13 is provided with a memory 130 for storing policy data. This memory 130, which is constructed of a readable/writable storage cell permitting a memory holding operation (e.g., a flash memory or an E$^2$PROM), is connected to a data input/output interface 133 via a signal line 134.

Further, a switch 131 that can be turned ON and OFF is disposed in the ignition key 13 and connected to an instruction input/output interface 132 via a signal line 135.

When the ignition key 13 is inserted into the keyhole of the vehicle, the above-mentioned interfaces 132 and 133 are connected to the network 15. In this state, the policy node 1 can read the contents of the memory 130 and write them into the memory 130 via the reader-writer 12. Further, as will be described later, when the policy node 1 inquires of the driver whether to save policy data, the policy data set by the driver in the vehicle can be written into and held by the memory 130 of the ignition key 13 by operating the switch 131.

Further, if a plurality of ignition keys 13 are prepared for the single vehicle 100 and distributed to a plurality of drivers and policy data of each of the driver are stored in the memory 130 of a corresponding one of the ignition keys 13, the vehicle 100 can be driven in a setting (vehicle state) that differs depending on each of the drivers.

<Outline of Policy Node>

The outline of control performed in the policy node 1 will now be described hereinafter.

The policy node 1 weights the objective functions stored in the storage device 16 on the basis of policy data inputted from the ignition key 13 and the like.

Then, the policy node 1 sets an operational amount of the driver (user parameter) obtained from any one of the aforementioned user sensors, an external parameter based on the running state and running environment of the vehicle 100, and an internal parameter of each of the control nodes into each of the objective functions.

Regarding the user parameter and the external parameter as inputs, the policy node 1 calculates (tunes) the internal parameter so as to minimize or maximize the value of the objective function. The policy node 1 then gives this calculation result to each of the control nodes as an operational amount command value.

The respective parameters will now be described.

The user parameter, external parameter, and internal parameter to be given to the objective function are as follows.

The user parameter, which is directly operated by the user (driver), may be, for example, the operational amount of the accelerator or the steering angle of the steering wheel. This user parameter is called a user's critical parameter (hereinafter referred to as a UCP).

The external parameter, which cannot be controlled by the user and affects the component to be controlled, may be, for example, the temperature of outside air or the gradient of a road surface. In other words, the parameter affects the performance of the vehicle. This external parameter is called an external critical parameter (hereinafter referred to as an XCP).

The internal parameter, which cannot be directly controlled by the user and is determined by the internal structure of each of the control nodes, may be, for example, the fuel injection amount of the engine or the spring constant of the suspension. This internal parameter is called an internal critical parameter (hereinafter referred to as an ICP).

For instance, given that "the amount of fuel consumption", "the operational amount of the accelerator", "wheel speed", and "the fuel injection amount of the engine" are selected as an objective function F, the UCP, the XCP, and the ICP respectively, the tuning of the parameters means "adjusting the fuel injection amount of the engine to minimize the amount of fuel consumption under the conditions of an operational amount of the accelerator operated by the user and a wheel speed of a currently running one of the wheels."

Then, a mode of describing the user's policy is defined as follows.

Firstly, a plurality of objective functions are prepared. For example, "the amount of fuel consumption" and "the emission amount of NOx" are selected as objective functions F1 and F2 respectively.

Secondly, the user's policy is defined as "a weighting value indicating how much priority is to be given to which one of F1 and F2". For instance, F1:F2=4:3.

Thirdly, the objective functions F1 and F2 are described using the aforementioned three parameters.

F1=F1(UCP, XCP, ICP)
F2=F2(UCP, XCP, ICP)

Regarding the user's policy defined above, the UCP, and the XCP as inputs, the tuning of the aforementioned parameters is carried out as "a combinatorial optimization problem". In other words, after the values of the UCP and the XCP have been assigned to the objective functions F1 and F2 and the weighting of F1:F2=4:3 has been carried out, an optimal value of the ICP is calculated.

Known as a solution to the aforementioned combinatorial optimization problem is to develop the aforementioned objective function F as a polynomial and determine coefficients of the polynomial from the UCP, the XCP, the ICP, and an implementation result corresponding to these parameters by means of a statistical technique called a method of least squares, as disclosed on page 5 of JP 2000-276454 A which was filed by the same applicant.

Further, the policy node 1 can perform control for supervising the respective control nodes, for example, traction control for preventing the driving wheels from rotating idly and vehicle stability control (VSC) for ensuring stability of the vehicle 100.

In the traction control, when idle rotation of a driving wheel is detected from, for example, a wheel speed and a vehicle body speed (values detected by the navigation node 8 and the like), the engine control node 2 and the throttle control node 3 are commanded to reduce a torque, and the ABS control node 5 is commanded to brake the idly rotating wheel.

In the VSC, when the vehicle making a turn demonstrates an excessive oversteering or understeering tendency, the ABS control node 5 and the steering control node 9 are commanded to brake the respective wheels to obtain an appropriate yaw rate, and the engine control node 2 and the throttle control node 3 are commanded to optimize a driving force.

(A) Objective Functions

An example of setting objective functions will now be described hereinafter. In this example, six objective functions F1, F2, F3, F4, F5, and F6 are provided. Those objective functions F1 to F6 constitute an objective function group.

First of all, the objective function F1 is defined as controllability (responsiveness or active safety), that is, the responsiveness of the vehicle 100 to a driving operation. The value of this objective function F1 (the operational command value=ICP) is a target driving force (fuel injection amount and gear ratio), a steering angle, or the like. When a policy for increasing controllability is set, the target driving force is increased (fuel injection amount=large, gear ratio=on the Lo side) to ensure accelerating performance, and an ICP for steering the rear wheels mainly in a reversed-phase fashion with the aim of causing the quick rising of a yaw rate is obtained. On the other hand, when a policy for reducing controllability is set, the target driving force is reduced (fuel injection amount=small, gear ratio=on the Hi side), and an ICP for steering the rear wheels mainly in an in-phase fashion with the aim of causing the gentle rising of a yaw rate is obtained.

The objective function F2 is defined as safety (passive safety), that is, post-collision safety (referred to as after-safety). The value of this objective function F2 is a height of the suspension system, a spring constant of the suspension system, a damping force of the suspension system, a pressure of working fluid for the air bag, or the like. This is because the suspension system shifts the positions of loads and thus affects the rigidity of the entire vehicle body.

The objective function F3 is defined as mileage (Km/l). The value of this objective function F3 is a target driving force (fuel injection amount and gear ratio). When a policy for increasing mileage is set, the target driving force is reduced (fuel injection amount=small, gear ratio=on the Hi side) and an ICP for increasing mileage is obtained. On the other hand, when a policy for reducing mileage is set, the target driving force is increased (fuel injection amount=large, gear ratio=on the Lo side), and an ICP for enhancing the accelerating performance despite a decrease in mileage is obtained. However, when the mileage is reduced, the ICP is limited below a value prescribed in a statute or the like.

The objective function F4 is an emission amount ($mm^3$) of a hazardous substance contained in exhaust gas. The value of this objective function F4 is an engine speed, an intake air volume, a fuel injection amount, or a gear ratio. When a policy for reducing the emission amount of the hazardous substance is set, an IPC for reducing the engine speed, the intake air volume, or the fuel injection amount is obtained. On the other hand, when a policy for increasing the emission amount of the hazardous substance is set, the target driving force is increased (fuel injection amount=large, gear ratio=on the Lo side), and an ICP for increasing the engine speed, the intake air volume, or the fuel injection amount is obtained. However, when the emission amount of the hazardous substance is set great, the ICP is limited below a value prescribed in a statute or the like.

The objective function F5 is defined as tranquility (db). The value of this objective function F5 is an engine speed, a spring constant of the suspension system, or a damping force of the suspension system. When a policy for increasing tranquility is set, an ICP for reducing the engine speed and the damping force and spring constant of a damper of the suspension system is obtained. On the other hand, when a policy for reducing tranquility is set, an ICP for increasing the engine speed and the damping force and spring constant of the damper is obtained. However, the ICP is limited below a noise level prescribed in a statute or the like.

The objective function F6 is defined as driving comfort (a displacement, rotational angle, speed, angular speed, or acceleration at the center of gravity of each passenger). The value of this objective function F6 is a spring constant of the suspension system, a damping force of the suspension system, or a steering angle of the steering wheel. When a policy for increasing driving comfort is set, an ICP for reducing the damping force and spring constant of the damper and making the steering angles of the front and rear wheels equal in phase so as to cause the gentle rising of a yaw rate is obtained. On the other hand, when a policy for reducing driving comfort is set, an ICP for increasing the damping force and spring constant of the damper and making the steering angles of the front and rear wheels reverse in phase so as to cause the quick rising of a yaw rate is obtained.

(B) Setting of Parameters

It will now be described how to set the UCP as a user parameter, the XCP as an external parameter, and the ICP as an internal parameter.

The UCP as an input value of the user is defined, for example, as follows.

UCP-1 is an accelerator operational amount=a value detected by the accelerator operational amount sensor S1.

UCP-2 is a brake operational amount=a value detected by the brake operational amount sensor S2.

UCP-3 is a shift position=a value detected by the shift position sensor S4.

UCP-4 is a steering angle of the steering wheel=a value detected by the steering angle sensor S3.

The XCP as an input value of the external parameter based on the running state and running environment of the vehicle 100 is then defined, for example, as follows.

XCP-1 is a distance to a preceding vehicle=a value detected by the millimeter wave radar S5.

XCP-2 is a wheel speed=a value detected by the wheel speed sensor S10 or S11.

XCP-3 is an outside air temperature=a value detected by the outside air temperature sensor S8. Alternatively, XCP-3 may be a value received by the navigation node 8 from a road traffic information system.

XCP-4 is an outside wind speed=a value detected by the wind speed sensor S9. Alternatively, XCP-4 may be a value received by the navigation node 8 from the road traffic information system.

XCP-5 is a road surface resistance=a value detected by the road surface sensor S6. Alternatively, XCP-5 may be a value received by the navigation node 8 from the road traffic information system.

XCP-6 is a road surface ascending/descending angle (gradient)=a value detected by the on-board camera S7. Alternatively, XCP-6 may be a value based on map information which is calculated by the navigation node 8.

XCP-7 is a road meander degree (curvature) R=a value detected by the on-board camera S7. Alternatively, XCP-7 may be a value based on map information which is calculated by the navigation node 8.

XCP-8 is a traffic volume or a traffic congestion degree=a value received by the navigation node 8 from the road traffic information system. Alternatively, XCP-8 may be a value obtained by recognizing an image from the on-board camera S7.

XCP-9 is a speed limit=a value received by the navigation node 8 from the road traffic information system. Alternatively, XCP-9 may be a value acquired by the navigation node 8 on the basis of map information.

XCP-10 is a displacement limit=a value received by the navigation node 8 from the road traffic information system. Alternatively, XCP-10 may be a value acquired by the navigation node 8 on the basis of map information.

XCP-11 is a noise level limit=a value received by the navigation node 8 from the road traffic information system. Alternatively, XCP-11 may be a value acquired by the navigation node 8 on the basis of map information.

The ICP outputted by the policy node 1 as an internal parameter of each of the control nodes is then defined, for example, as follows.

ICP-1 is an engine speed=a value obtained from the engine control node 2 (a value detected by the crank angle sensor).

ICP-2 is an engine intake air volume=a value obtained from the electronic throttle control node 3 (a value detected by the airflow meter).

ICP-3 is an engine fuel injection amount=a value obtained from the engine control node 2.

ICP-4 is a gear ratio=a transmission control system.

ICP-5 is a front-wheel steering angle (ICP5-right/ICP5-left)=a value obtained from the steering control node 9.

ICP-6 is a rear-wheel steering angle (ICP6-right/ICP6-left)= a value obtained from the steering control node 9.

ICP-7 is a power steering oil pressure of a front-wheel steering angle actuator 90 or an assist amount=a value obtained from the steering control node 9.

ICP-8 is a power steering oil pressure of a rear-wheel steering angle actuator 91=a value obtained from the steering control node 9.

ICP-9 is a driving force distribution ratio=a value obtained from the driving force distribution control node.

ICP-10 is a brake pump oil pressure=a value obtained from the ABS control node.

ICP-11 is a suspension length=a value obtained from the suspension control node 6.

ICP-12 is a suspension spring constant=a value obtained from the suspension control node 6.

ICP-13 is a suspension damping constant=a value obtained from the suspension control node 6.

ICP-14 is an air bag air injection amount=a value obtained from the safety management node 10.

The UCP, XCP, and ICP are defined as described above.

(C) Setting of Objective Functions and Parameters

Then, a relationship among the objective functions defined above in (A) and the respective parameters defined above in (B) is determined, and the objective functions F1 to F6 are defined.

The objective functions F1 to F6 do not always utilize all the UCP's, XCP's, and ICP's. Instead, those parameters may be suitably selected according to a vehicle characteristic to be tuned by each of the objective functions F and be set therein.

For instance, as shown in a combination table of FIG. 4A and FIG. 4B, the UCP, XCP, and ICP to be used in each of the objective functions F are suitably set.

In one example of the objective function F1 representing controllability, all the UCP's, namely, UCP-1 to UCP-4, the XCP's except the outside air temperature XCP-3, and the ICP's except the air bag air injection amount ICP-14 are set. In the objective function F2 representing after-safety, the air bag air injection amount ICP-14, the suspension length ICP-11, the suspension spring constant ICP-12, and the suspension damping coefficient ICP-13 are controlled using only the distance XCP-1 to a preceding vehicle, the wheel speed XCP-2, and the road meander degree XCP-7 as inputs.

Similarly, the UCP's and XCP's required as inputs and the ICP's to be outputted are defined in the objective function F3 representing mileage, the objective function F4 representing exhaust emission performance, the objective function F5 representing tranquility, and the objective function F6 representing driving comfort. Thus, the objective functions F1 to F6 are set.

(D) Application of Policy

The policy node 1 applies a policy by weighting the aforementioned objective functions F1 to F6 on the basis of the policy data stored in the ignition key 13 and the policy data inputted from the display device 11 or the like.

Figure 5:
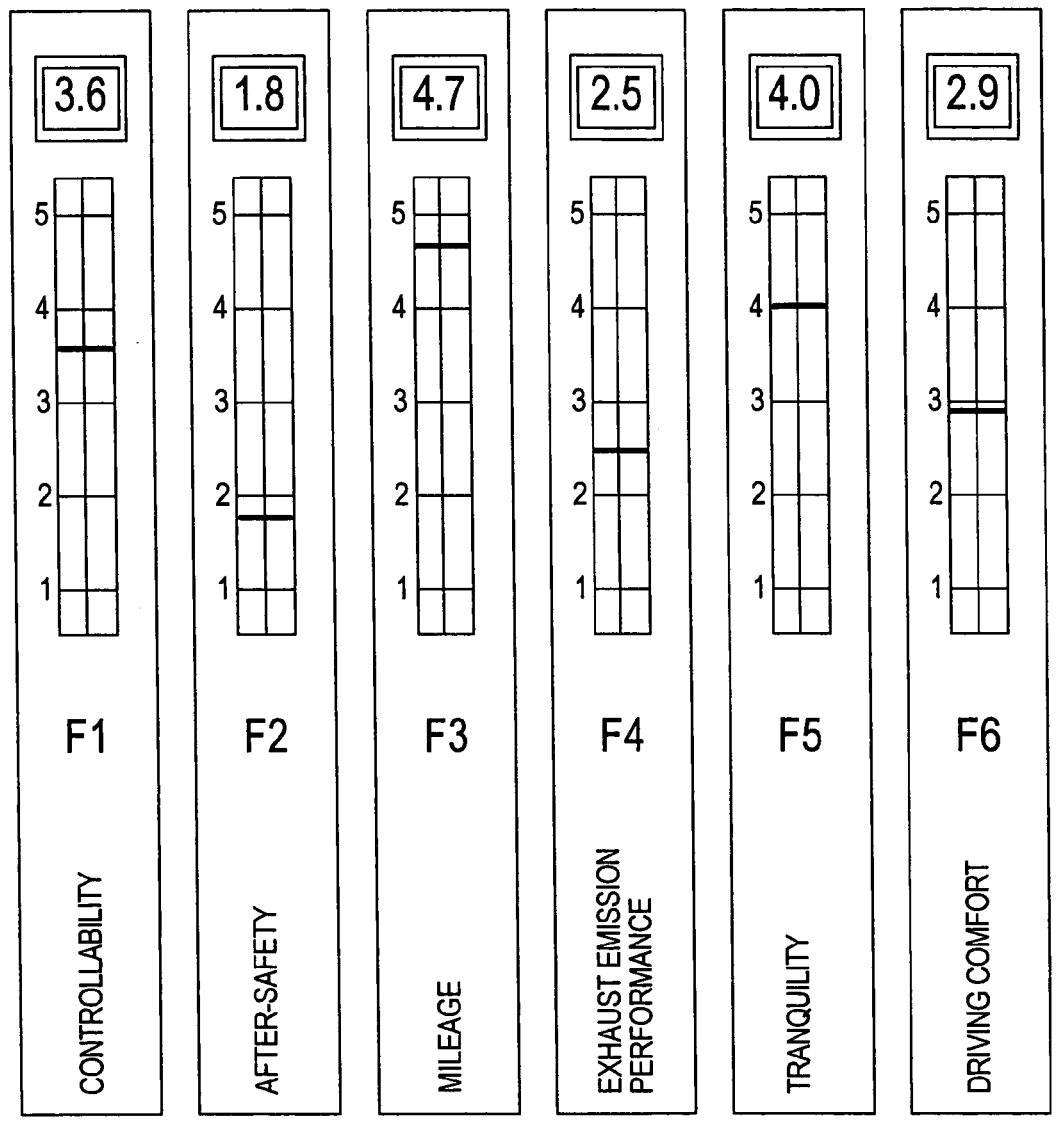
FIG. 5 is a screen image for setting policies for objective functions F1 to F6 individually.

When policy data are inputted from the ignition key 13 or when the driver issues a command to set a policy, the display device 11 displays a screen for setting a policy for each of the objective functions F1 to F6 as shown in FIG. 5.

The driver can change the policy in each of the objective functions F1 to F6 by operating a touch panel or the like of the display device 11. In this case, the display device 11 displays a state where the policy data have just been read from the ignition key 13.

The policy data to be applied to the objective functions F1 to F6 can be set by setting a numerical value ranging from "1" to "5". The performance of the vehicle 100 corresponding to each of the objective functions F1 to F6 improves as the numerical value increases. The performance of the vehicle 100 corresponding to each of the objective functions F1 to F6 deteriorates as the numerical value decreases. A predetermined value (e.g., 3) is set as a standard value.

For example, since the controllability as the objective function F1 is set to "3.6", the responsiveness is set slightly higher than its standard value. On the other hand, since the after-safety is set to "1.8", it is set lower than its standard value.

Further, policy application examples according to the circumstances will be mentioned below.

Running Policy Prioritizing Safety and Driving Comfort of Fellow Passengers

[F1, F2, F3, F4, F5, F6]=[2:4:1:2:3:4]

In this case, the objective functions representing after-safety and driving comfort, to which priority is given, are set large, and safety is made much of at the cost of mileage.

Running Policy Making Much of Drivability

[F1, F2, F3, F4, F5, F6]=[5:1:2:2:1:1]

In this case, the highest priority is given to controllability at the cost of the others, and the responsiveness is enhanced.

Running Policy in Case where Vehicle is shared with VIP

[F1, F2, F3, F4, F5, F6]=[1:5:1:1:5:5]

In this case, after-safety, tranquility, and driving comfort are prioritized.

As described above, an arbitrary policy can be set for each of the objective functions F1 to F6.

(E) Calculation of Combinatorial Optimization Problem

Figure 6A:
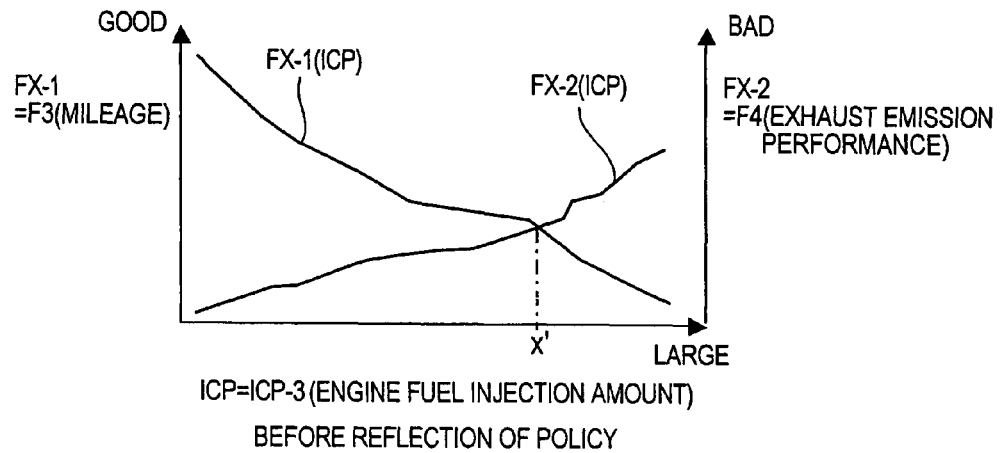
FIG. 6A is a graph showing a solution to a combinatorial optimization problem as to two functions before application of policies.
Figure 6B:
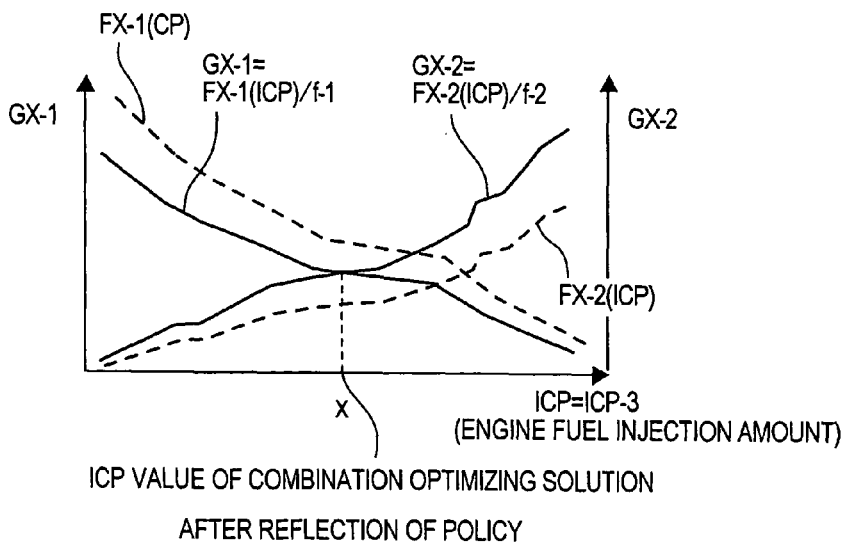
FIG. 6B is a graph showing a solution to a combinatorial optimization problem as to two functions after application of the policies.

Referring now to FIG. 6A and FIG. 6B, a solution to a combinatorial optimization problem and application of a plurality of objective functions and policies will be described.

Referring to FIG. 6A, consideration is given to a case where an optimal ICP is obtained while the objective function F3 representing mileage and the objective function F4 representing exhaust emission performance are defined as FX-1 and FX-2 respectively, with no policy applied thereto.

To simplify the description, it is assumed herein that the UCP's and XCP's as fixed values are assigned to the functions FX-1 and FX-2, and that the fuel injection amount ICP-3 is outputted. The characteristic demonstrated by the function FX-1 (ICP) of mileage is that the rate of fuel consumption deteriorates as the amount of fuel injection increases. The characteristic demonstrated by the function FX-2 of exhaust emission performance is that the exhaust emission performance deteriorates (i.e., the emission amount of gas increases) as the amount of fuel injection increases. The function FX-1 retrieves a fuel injection amount ICP-3 corresponding to a maximum mileage. The function FX-2 retrieves an ICP-3 corresponding to the best exhaust emission performance (or a minimum emission amount).

Therefore, we can conclude that the combinatorial optimization problem of those two functions FX-1 and FX-2 is solved by retrieving an ICP-3 maximizing the function FX-1 and minimizing the function FX-2. In other words, referring to FIG. 6A, the value of an intersection point X' of the functions FX-1 and FX-2 represents an optimal fuel injection amount ICP-3.

FIG. 6B shows a case where policies are reflected on the aforementioned functions FX-1 (ICP-3) and FX-2 (ICP-3). A policy f-1 is applied to the function FX-1 regarding mileage. A policy f-2 is applied to the function FX-2 regarding exhaust emission performance.

A new function to which the policy f-1 is applied is denoted by GX-1.

$$GX\text{-}1=FX\text{-}1(ICP)/f\text{-}1 \quad (1)$$

By the same token, a new function to which the policy f-2 is applied is denoted by GX-2.

$$GX\text{-}2=FX\text{-}2(ICP)/f\text{-}2 \quad (2)$$

It should be noted, however, that f-1>1 and that f-2>1.

As a result of reflection of the policies f-1 and f-2, the fuel consumption characteristic represented by the function GX-1 and the exhaust emission performance represented by the function GX-2 are as indicated by solid lines in FIG. 6B. Those are located below characteristic curves prior to the application of the policies as indicated by dotted lines in FIG. 6B.

As in the aforementioned case of FIG. 6A, the ICP corresponding to a minimum mileage and maximum exhaust emission performance as a solution to an optimization problem is X, which corresponds to an intersection point of the functions GX-1 and GX-2.

As described above, it is appropriate to apply policies (i.e., weighting coefficients of the respective objective functions) to the objective functions F and select an ICP for optimizing each of the functions using the UCP and XCP as inputs.

In fact, as described above with reference to FIG. 4A and FIG. 4B, a plurality of objective functions F are concerned with a single ICP in some cases (e.g., the fuel injection amount ICP-3 is calculated using the objective functions F1 and F3 to F6). In this case, however, a weighted average according to a policy (weighting) assigned to each of the objective functions F or a representative value corresponding to the magnitude of the policy may be selected.

For instance, when the above-mentioned running policy making much of drivability is set as [F1, F2, F3, F4, F5, F6]=[5:1:2:2:1:1], the fuel injection amount ICP-3 is calculated from the objective functions except F2, that is, the objective functions F1 and F3 to F6 using the above-mentioned FIG. 4A and FIG. 4B. In this case, a weighted average, which is obtained using the ratio of each of the policies to the sum of the policies assigned to the five objective functions as a proportional distribution ratio, may be outputted as ICP-3.

Alternatively, as described above with reference to FIG. 6B, it is also appropriate to select a plurality of (e.g., two) objective functions with large policy values and calculate an ICP on the basis of these representative objective functions. In this case, the arithmetic load imposed on the policy node 1 can be reduced significantly.

Figure 7:
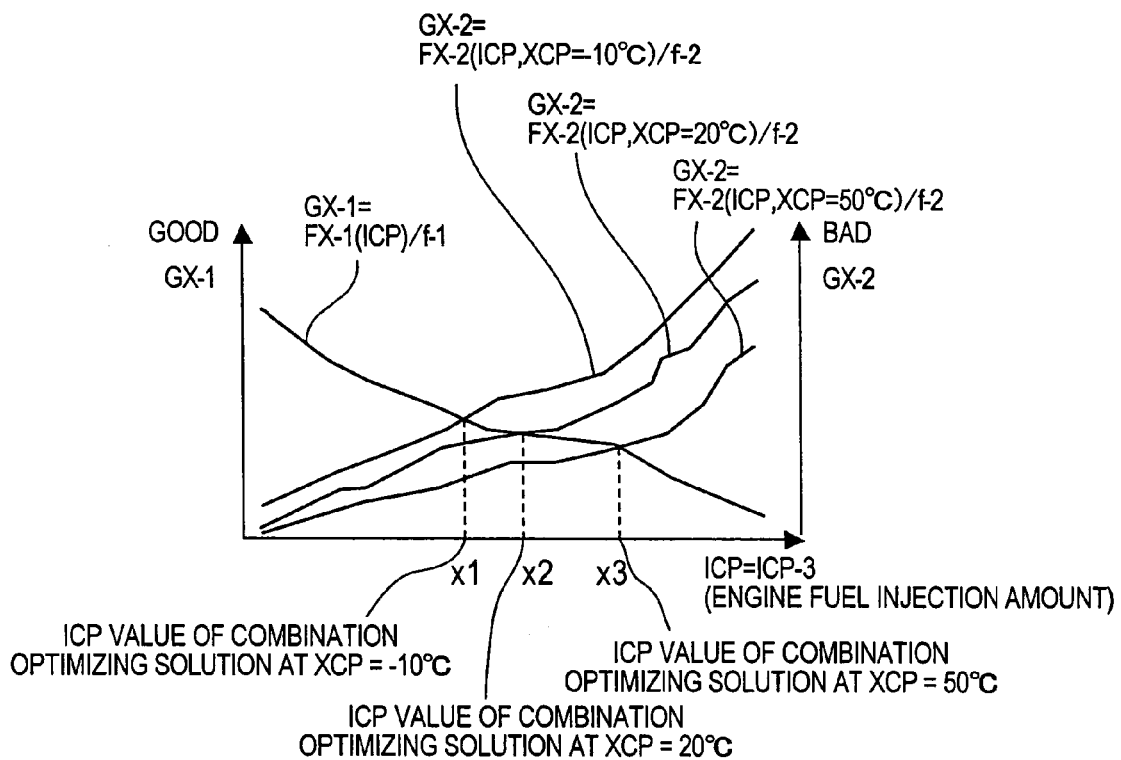
FIG. 7 is also a graph showing a solution to a combinatorial optimization problem as to two functions in the case where an external parameter XCP of one of the functions is changed.

Referring to FIG. 7, it will now be described how the ICP to be used in each of the control nodes of the control target changes when the XCP as an external parameter of the vehicle 100 is changed in addition to the UCP as an operational input of the driver and the ICP.

In FIG. 7, the outside air temperature (XCP-3) is selected as the XCP of the objective function FX-2 regarding exhaust emission performance as described above with reference to FIG. 6B, and while the UCP is fixed, the outside air temperature is changed to −10° C., 20° C., and 50° C. As in the case of the above-mentioned FIG. 6A and FIG. 6B, the UCP and the XCP are fixed in respect of the objective function FX-1 regarding mileage.

Then, as described above with reference to FIG. 6B, the function GX-1 is obtained by applying a policy to the objective function FX-1, and the function GX-2 is obtained by applying a policy to the objective function FX-2.

Because the function GX-1 has the UCP and the XCP fixed, the fuel injection amount ICP-3 for mileage is outputted. On the other hand, the exhaust emission performance improves as the outside air temperature XCP-3 increases from −10° C. to 20° C. and then to 50° C.

Since the characteristic of the exhaust emission performance accompanies changes in the XCP, the optimal solutions of the functions GX-1 and GX-2 are x1, x2, and x3 at −10° C., 20° C., and 50° C. respectively, as is apparent from FIG. 7. It is understood that the ICP-3 as a solution to the optimization problem increases as the outside air temperature rises.

As described above, by giving the XCP as an input in addition to the UCP and the ICP, a suitable operational command value can be calculated according to changes in the environment outside the vehicle. In other words, the optimal tuning of the parameters can be automatically carried out regardless of changes in the outside environment. Further, the addition of a policy to the UCP and the XCP makes it possible to tune a parameter that takes account of a taste of the driver as well as the outside environment and the performance of the vehicle. Consequently, in an apparatus in which a plurality of control nodes operate in tandem, an optimal parameter (operational command value) can be automatically obtained.

<Control in Policy Node>

The control performed in the policy node 1 will now be described in detail with reference to a flowchart.

Figure 8:
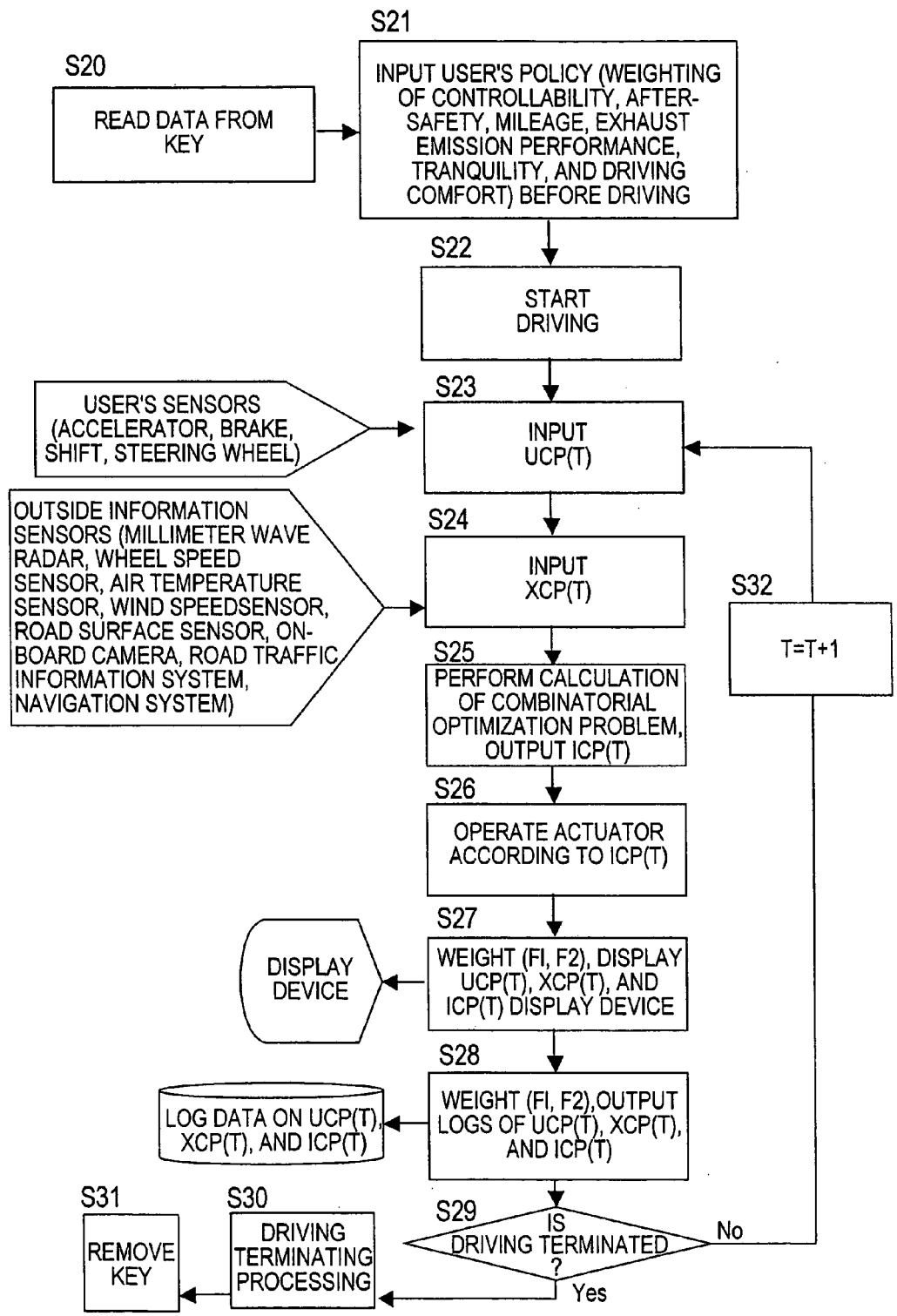
FIG. 8 is a flowchart showing an example of control performed in a policy node.

FIG. 8 shows a main routine of the control performed in the policy node 1. First of all, in a step S20, when the ignition key 13 is inserted into the keyhole, the reader-writer 12 reads the policy data from the memory of the ignition key 13. In a step S21, the weighting of the aforementioned objective functions F1 to F6 (controllability, after-safety, mileage, exhaust emission performance, tranquility, and driving comfort) is carried out on the basis of the policy data.

In the case dealt with herein, instead of using all the objective functions, only those having large policy values are used.

In a step S22, a counter T is reset in response to the start of driving. Then, a loop processing from steps S23 to S29 is performed.

In the step S23, each UCP(T) is inputted. As described above, a detected value of the accelerator operational amount UCP-1 is inputted from the accelerator operational amount sensor S1, a detected value of the brake operational amount UCP-2 is inputted from the brake operational amount sensor S2, a detected value of the shift position UCP-3 is inputted from the shift position sensor S4, and a detected value of the steering angle UCP-4 of the steering wheel is inputted from the steering angle sensor S3.

Then in a step S24, XCP's representing an outside environment are inputted from the respective sensors. As described above with reference to FIG. 4A and FIG. 4B, respective values of XCP-1(T) to XCP-11(T) are read.

In a step S25, a predetermined number of objective functions are selected from the objective functions F1 to F6 that are used on the basis of the policy data. For instance, two of the objective functions with large policy values are selected as FX-1 and FX-2.

The UCP and the XCP are inputted to each of the objective functions FX-1 and FX-2, and the calculation of the combinatorial optimization problem is performed as described above in (E). Then, a UCP resulting from a driving operation, an XCP resulting from an outside environment, and an optimal ICP(T) satisfying a policy set by the driver are calculated and outputted. In a step S26, each ICP(T) is transmitted to each of the control nodes, which then drives a corresponding one of the actuators as a control target.

In a step S27, the display device 11 displays the values of FX-1 and FX-2 and the respective values of the actually outputted ICP(T), UCP(T), and XCP(T) for the policy set as target values. In other words, the display device 11 displays the actual values for the target values.

Then in a step S28, the logs of the respective values of FX-1, FX-2, UCP(T), and XCP(T) in the aforementioned step S27 are stored into the storage device 16.

In a step S29, the ignition key 13 is turned OFF, and it is determined whether or not driving has been terminated. When driving is to be continued, a transition to a step S32 is made to increment the counter T. Then, a return to the step S23 is made and the above processings are repeated.

On the other hand, when driving has been terminated, a termination processing preset in a step S30 (which will be described later) is performed. In a step S31, the ignition key 13 is removed to terminate driving.

Figure 9:
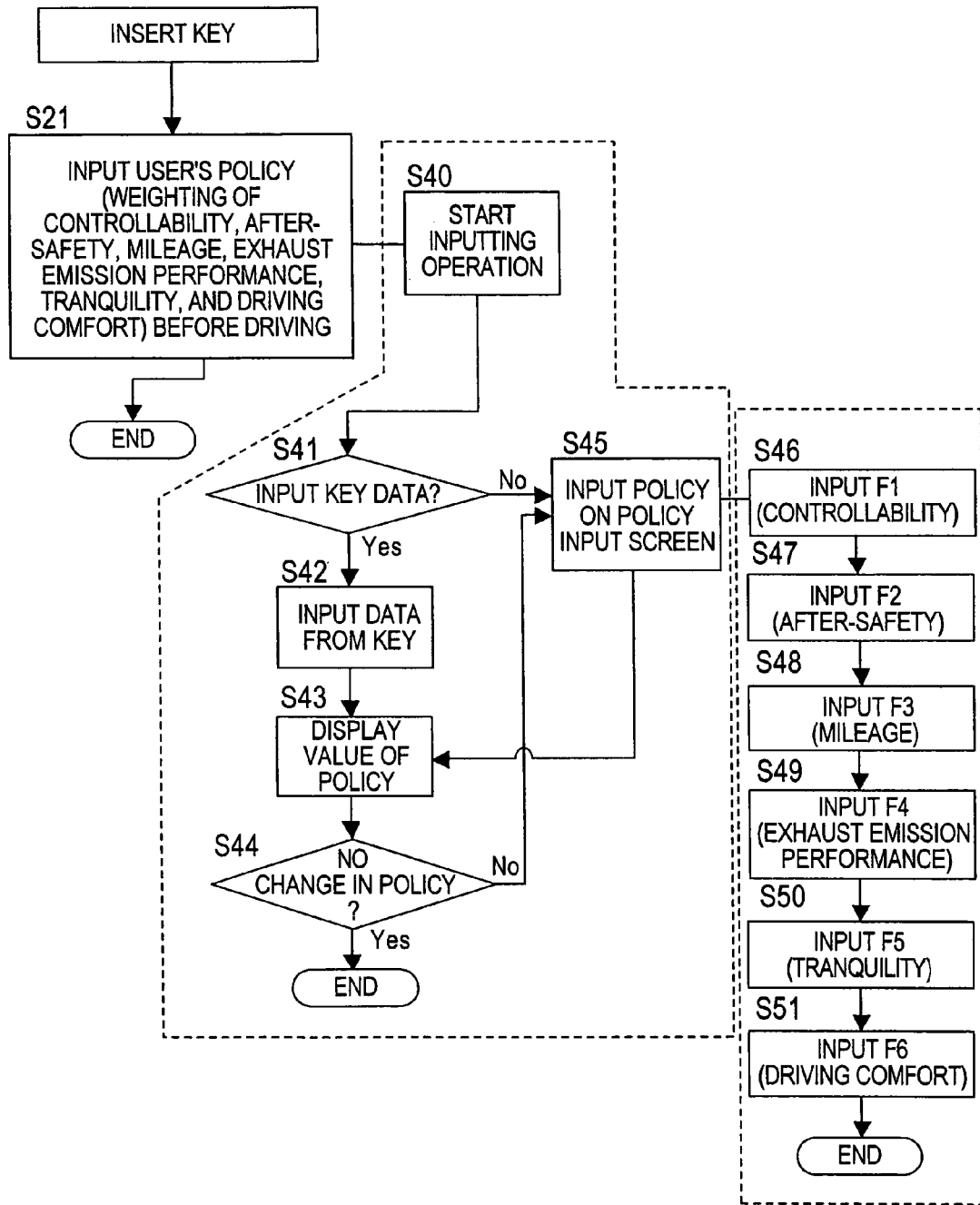
FIG. 9 is a flowchart showing a subroutine of a policy input processing performed in a step S21 of FIG. 8.

FIG. 9 shows a subroutine of the processing performed in a step S21 of the above-mentioned FIG. 8.

When the inputting of policy data is started in a step S40, the policy node 1 inquires of the driver whether to input the policy data stored in the ignition key 13 or not. This inquiry may be displayed by the display device 11 or can be outputted from an audio equipment (not shown).

When the driver operates the switch 131 of the ignition key 13 shown in the above-mentioned FIG. 3 in response to the inquiry, a transition to a step S42 is made to read the policy data from the ignition key 13. On the other hand, when the driver does not operate the switch 131, a transition to a step S45 is made to input policy data from the policy data input screen as shown in FIG. 5.

In the step S42, the policy node 1 reads the policy data from the memory 130 of the ignition key 13 via the reader-writer 12.

In a step S43, as shown in FIG. 5, the read policy data are displayed on the policy data input screen.

In a step S44, it is determined whether to change the policy data or not according to the operation of the driver. When the policy data are not changed, the read policy data are set in the objective functions F1 to F6. On the other hand, when the driver desires to change the policy data (it is determined according to the operation of the touch panel of the display device 11 whether or not the driver desires to change the policy), a transition to the step S45 is made to display the policy data input screen as shown in FIG. 5. In a subroutine of steps S46 to S51, the policy data are inputted for the objective functions F1 to F6 individually.

Figure 10:
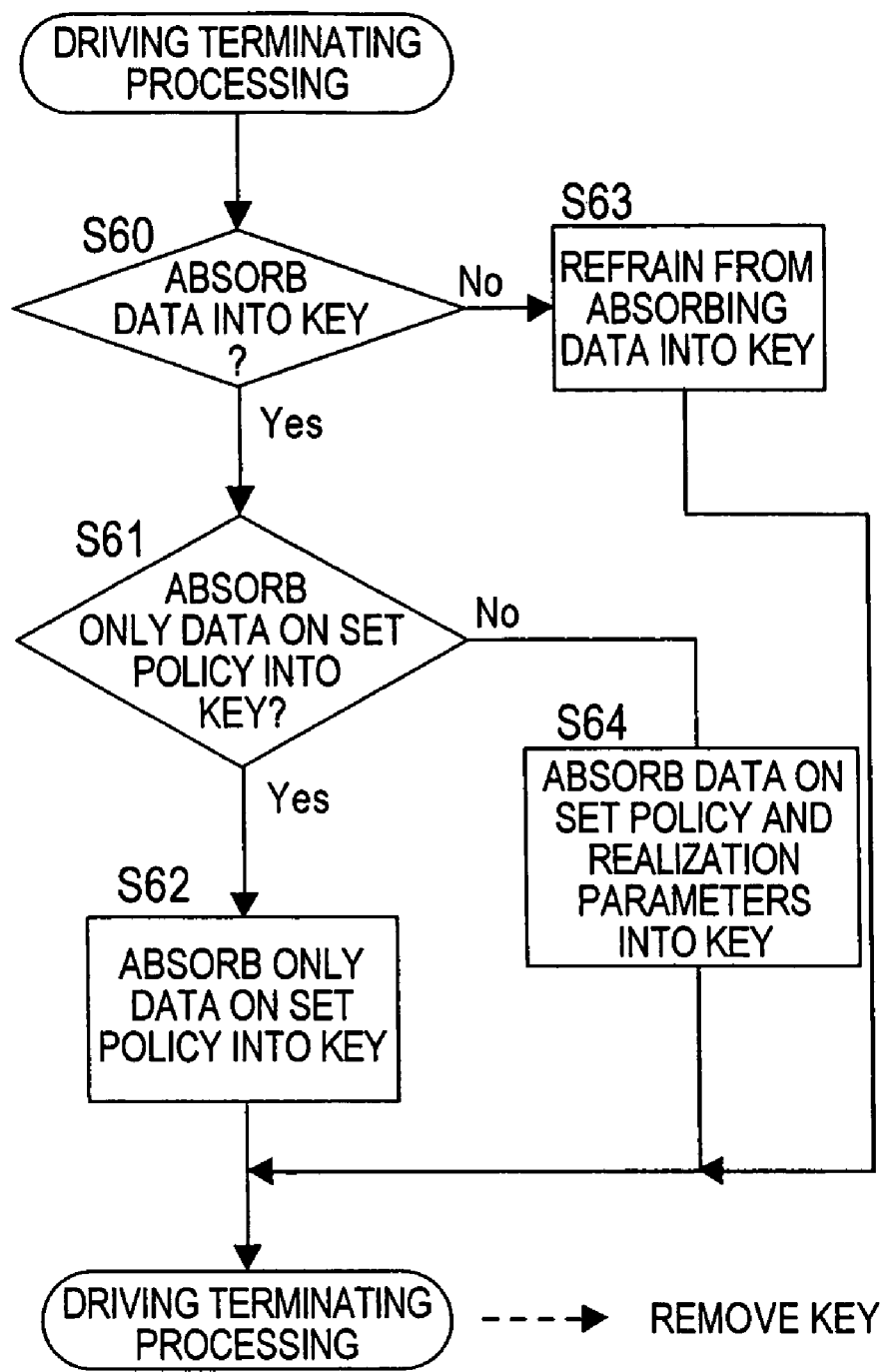
FIG. 10 is a flowchart showing a subroutine of a termination processing performed in a step S30 of FIG. 8.

FIG. 10 shows a subroutine of the termination processing performed in the step S30 of the above-mentioned FIG. 8.

In a step S60, when driving is terminated, it is determined whether to store the currently set policy data into the memory 130 of the ignition key 13 or not. This determination is made depending on, for example, whether or not the driver has operated the switch 131 of the ignition key 13. When it is determined that the driver stores the policy data into the ignition key 13, a transition to a step S61 is made. Otherwise, a transition to a step S63 is made to terminate the processing without storing the policy data into the memory 130.

In the case where the policy data are stored, it is determined in the step S61 whether or not the policy data is to be stored into the memory 130. This determination is also made as in the above-mentioned step S60. The actual values are the values of FX-1 and FX-2 calculated during driving.

When the actual values are not required, a transition to a step S62 is made to store only the policy data into the memory 130 of the ignition key 13.

When the actual values are included as well, a transition to a step S64 is made to store the policy data and the actual values into the memory 130 of the ignition key 13 and then terminate the processing.

Figure 11:
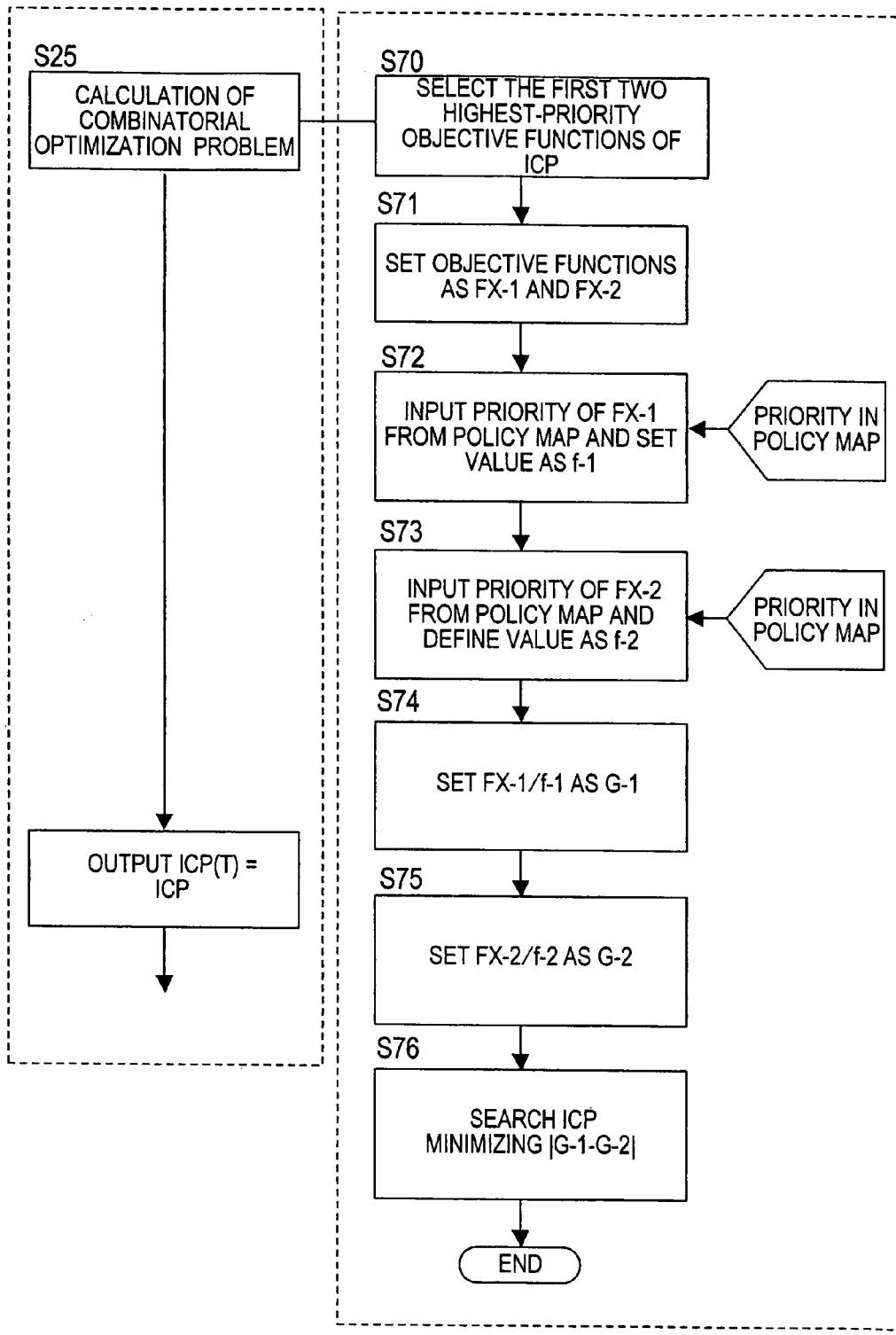
FIG. 11 is a flowchart showing a subroutine of a combinatorial optimization problem figured out in a step S25 of FIG. 8.

FIG. 11 shows a subroutine of the processing performed in a step S25 of the above-mentioned FIG. 8.

In a step S70, the policy values set in the respective objective functions F1 to F6 are regarded as representing priority. Then, the first two highest-priority objective functions are selected from them.

In a step S71, the selected objective functions are set as FX-1 and FX-2 respectively. In a step S72, the priority of the function FX-1 is inputted from a policy map indicating policy values and then set as f-1. The policy map relates set policy values to the objective functions in the above-mentioned FIG. 5.

In a step S73, the priority of the function FX-2 is inputted from the policy map indicating policy values and then set as f-2.

In a step S74, as shown in the above-mentioned FIG. 6B, a function obtained by weighting the function FX-1 with the value f-1 is set as the function GX-1.

In a step S75, as is the case with the aforementioned FX-1, a function obtained by weighting the function FX-2 with the value f-2 is set as the function GX-2.

In a step S76, an ICP for minimizing the absolute value of a difference between the functions GX-1 and GX-2 is calculated and set as an operational command value.

By inputting a driving policy in advance before driving through the aforementioned processings, the complicated setting of parameters of many ECU's (control nodes) can be automatically carried out. As a result, the vehicle can be easily made to travel according to the user's preference.

Further, an internal parameter ICP satisfying both the conditions in a balanced manner can be automatically tuned for a plurality of objective functions.

Then, according to the user's command (operation) and the outside environment, ECU control parameters complying with the user's policy can be determined in real time. In the conventional examples, since the setting of the parameters is substantially determined prior to the shipment of an apparatus, the parameters cannot be adjusted according to the user's state of utilization. Even if the parameters can be adjusted, a balance satisfying the user's policy cannot be acquired because a plurality of control nodes determine internal parameters individually as described in the aforementioned conventional examples.

In contrast, according to this invention, the tuning of the parameters of control targets (actuator driving nodes in FIG. 12) is realized using a policy for a plurality of objective functions. Thus, without imposing any burden on the user, balanced ICP's can be outputted and a control state matching the user's policy can be created.

Moreover, a manufacturer or the like can reduce the number of combinations of the parameters to be tested in manufacturing articles. In other words, if it is assumed that the internal parameter ICP is not limited in range by inputting a policy and that there are a piece of control software A (with N parameters) and a piece of control software B (with M parameters), the number of tests to be conducted on software interaction patterns equals N×M in the worst case. According to this invention, however, the number of tests to be conducted does not exceed the number of combinations of IPC's that are calculated from a value f derived from a policy. Thus, the man-hour and labor required in production can be significantly reduced and an improvement in productivity can be achieved.

Further, in the aforementioned conventional examples, the map, table, or the like for determining an ICP on the basis of a UCP is provided in each of the control nodes. According to this invention, however, the issuance of an operational command value from the policy node 1 to each of the control nodes suffices. Therefore, there is no need to provide a map or a table in each of the control nodes. Thus, the respective control nodes can be simplified in structure and the cost of production can be reduced. In addition, if a map, a table, or the like for calculating an ICP of each of the control modes is provided in the policy node 1, an operational verification among the respective control nodes can be conducted through a test in a single node. Thus, in comparison with a case where the consistency among the respective control nodes is verified after a plurality of control nodes have been connected, a substantial improvement in productivity can be achieved. In particular, the cycle of development can be shortened and the reliability of articles can be improved.

In the example shown in the aforementioned embodiment, the policy is inputted before the vehicle starts running. However, the policy may be changed from the setting screen in the above-mentioned FIG. 5 while the vehicle is running.

FIRST MODIFICATION EXAMPLE

Although this invention is applied to the vehicle in the case illustrated in the aforementioned embodiment, this is not obligatory. This invention is applicable to equipment, aircrafts, devices, and the like that are provided with a plurality of ECU's.

Figure 12:
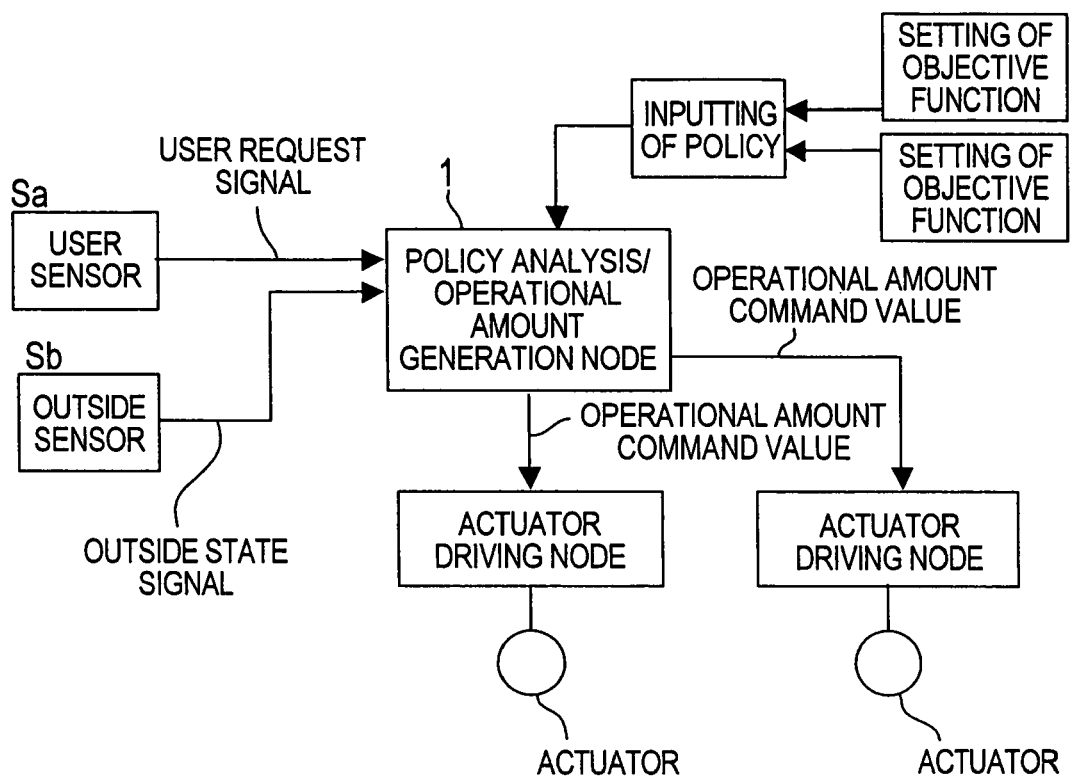
FIG. 12 is a block diagram showing a control concept of this invention.

In other words, as shown in FIG. 12, the control system of this invention may comprise a user sensor Sa for sensing the user's operational command, an outside sensor Sb for detecting an environment outside the apparatus, a plurality of objective functions for calculating command values for a plurality of control nodes (the actuator driving nodes in FIG. 12) using values detected by the sensors Sa and Sb as inputs, and the policy node 1 for tuning command values for the respective control nodes to create a control state complying with a policy as described above by weighting the respective objective functions with the policy.

It is not indispensable that each of the control nodes generate an output to the actuator. For instance, it is also appropriate that each of the control nodes generate an output to an electronic device or the like.

Figure 13:
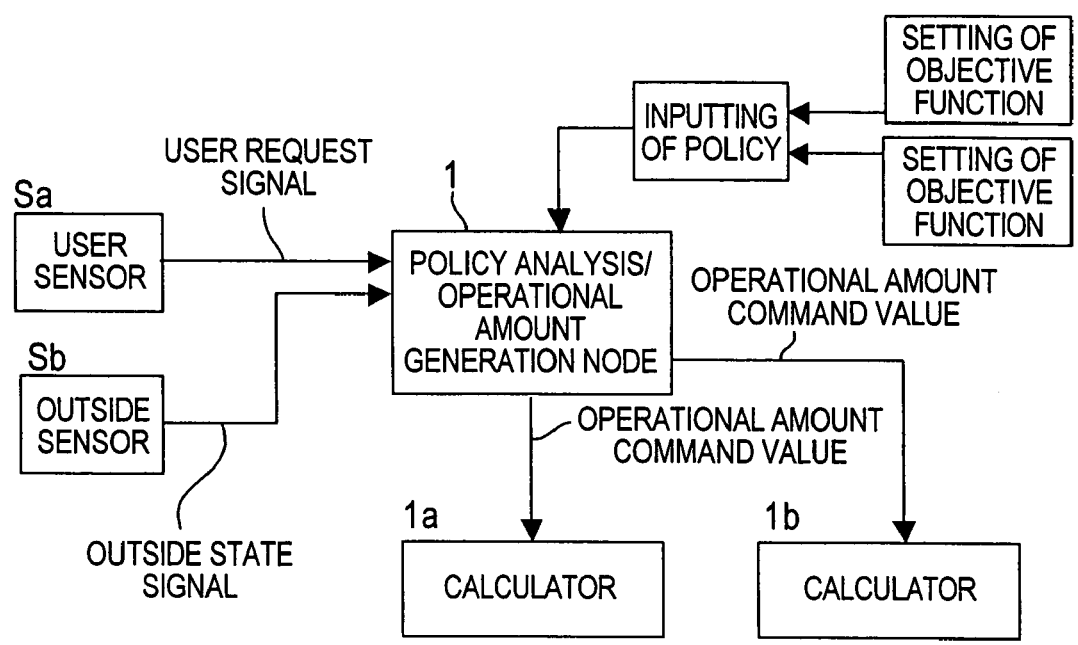
FIG. 13 is a block diagram showing a modification example.

For example, a plurality of control nodes for performing a single control in association with one another may be constructed as servers. In other words, when a plurality of servers are worked in association with one another to provide a single service, the application of the policy node 1 of this invention establishes a structure as shown in FIG. 13. The policy node 1 is connected to the respective servers via a network. The policy node 1 then functions as a superordinate calculator (superordinate node) of those interactive servers (calculators $1a$ and $1b$ in FIG. 13), and commands each of the servers to adopt a control parameter based on a policy given by the user or a supervisor.

The user's policy for the service provided by the plurality of servers, an input (UCP) from the user, and an external parameter (XCP) are inputted to the policy node 1.

As in the case of the aforementioned embodiment, the policy node 1 weights a plurality of objective functions according to the user's policy, calculates a command value for each of the servers from the objective functions, and tunes a command value ICP in accordance with the policy. Then, the policy node 1 issues the command value to each of the servers.

Thus, by inputting a service policy to the policy node 1, the complicated setting of parameters of many servers (calculator nodes) can be automatically carried out. As a result, the service can be provided easily and automatically according to the user's preference.

As described above, this invention makes it possible to automatically tune parameters of a plurality of control nodes on the basis of a policy of the user and is therefore applicable to vehicles, aircrafts, equipment, or apparatuses that are provided with a plurality of ECU's, or to systems in which a plurality of servers are worked in association with one another.

While the present invention has been described in detail and pictorially in the accompanying drawings, the present invention is not limited to such detail but covers various obvious modifications and equivalent arrangements, which fall within the purview of the appended claims.

What is claimed is:

1. A vehicular control system, comprising a plurality of control nodes connected to a network and control targets respectively controlled by the control nodes, for controlling each of the control targets in association with the plurality of control nodes based on a driving state of a vehicle, the vehicular control system comprising:

a user parameter input module for inputting a user parameter corresponding to an operation of a driver;

an external parameter input module for inputting an external parameter resulting from an outside environment of a vehicle;

means for setting a plurality of objective functions for each control characteristic and calculating an internal parameter of each of the control targets from the user parameter and the external parameter;

a policy setting module for setting policies indicating a driving index of the driver for the objective functions, respectively, wherein the policy setting module is configured to include policy data of the driver based on an election by the driver of plural ones of objective functions on a display;

a parameter adjusting module for respectively weighting the plural objective functions based on the policies and including an internal parameter adjusting module for adjusting the internal parameter in accordance with the policies to optimize the internal parameter among the plural weighted objective functions, wherein the internal parameter indicates the shift of the individual values on each objective function, the internal parameter adjusting module compares the shifts of the values between the plurality of objective functions for each internal parameter, and the internal parameter is adjusted based on the comparison result; and an output module for issuing, as a command; the internal parameter obtained in the parameter adjusting module to that one of the control nodes which corresponds to the internal parameter, wherein the parameter adjusting module further calculates, in every control cycle from a start of driving to an end of driving, the internal parameter using the user parameter and the external parameter as inputs so that each of the plurality of objective functions takes an optimum value.

2. The vehicular control system according to claim 1, wherein the means for setting the objective functions is configured to calculate a plurality of internal parameters from a plurality of user parameters and a plurality of external parameters, and wherein the internal parameter adjusting module selects a plurality of superordinate ones of the weighted objective functions and adjusts the internal parameters.

3. The vehicular control system according to claim 2, wherein the policy setting module is configured to record the selected objective functions and inputs and outputs of the objective functions white the vehicle is running.

4. The vehicular control system according to claim 1, wherein the policy setting module is configured to input the policies from an input device provided in the vehicle.

5. The vehicular control system according to claim 1, wherein the policy setting module is configured to input the policies from a storage device provided in a key of the vehicle.

6. The vehicular control system according to claim 5, wherein the policy setting module is configured to store the policies into the storage device provided in the key of the vehicle when driving is terminated.

7. A control system, comprising a plurality of control nodes connected to a network and control targets respectively controlled by the control nodes, for controlling each of the control targets in association with the plurality of control nodes, the control system comprising:

a user parameter input module for inputting a user parameter corresponding to an operation of a user;

an external parameter input module for inputting an external parameter resulting from an outside environment;

means for setting a plurality of objective functions for each control characteristic and calculating an internal parameter of each of the control targets from the user parameter and the external parameter;

a policy setting module for setting policies indicating a control index for the objective functions, respectively, wherein the policy setting module is configured to include user policy data based on an election by the user of plural ones of objective functions on a display;

a parameter adjusting module for respectively weighting the plural objective functions based on the policies and including an internal parameter adjusting module for adjusting the internal parameter in accordance with the policies to optimize the internal parameter among the plural weighted objective functions, wherein the internal parameter indicates the shift of the individual values on each objective function, the internal parameter adjusting module compares the shifts of the values between the plurality of objective functions for each internal parameter, and the internal parameter is adjusted based on the comparison result; and an output module for issuing, as a command, the internal parameter obtained in the parameter adjusting module to that one of the control nodes which corresponds to the internal parameter, wherein the parameter adjusting module further calculates, in every control cycle from a start of driving to an end of driving, the internal parameter using the user parameter and the external parameter as inputs so that each of the plurality of objective functions takes an optimum value.

8. The vehicular control system according to claim 1, wherein the election by the driver of plural ones of the objective functions further includes setting the relative weighted strengths of the objective functions.

9. The vehicular control system according to claim 8, wherein the objective functions on display include controllability (F1), after-safety (F2), mileage (F3), exhaust emission performance (F4), tranquility (F5), and driving comfort (F6).

10. The vehicular control system according to claim 9, wherein the weighted strengths are set on a basis of a numerical scale, in which a mid-value of a numerical scale corresponding to each objective function represents a standard performance value of that objective function.

11. The vehicular control system according to claim 10, wherein the policy data of the driver are adjustable by altering the elected group of plural objective functions and/or changing the relative weighted strengths.

12. The vehicular control system according to claim 11, wherein the policy data of different drivers of the vehicle are associated with separate input devices of the vehicle.

13. The vehicular control system according to claim 9, wherein the policy data of the driver are adjustable by altering the elected group of plural objective functions and/or changing the relative weighted strengths.

14. The vehicular control system according to claim 9, wherein the policy data of a different driver of the vehicle are associated with separate input devices of the vehicle.

15. The vehicular control system according to claim 8, wherein the policy data of the driver are adjustable by altering the elected group of plural objective functions and/or changing the relative weighted strengths.

16. The vehicular control system according to claim 8, wherein the policy data of a different driver of the vehicle are associated with separate input devices of the vehicle.

17. The vehicular control system according to claim 1, wherein policy data of a different driver of the vehicle are associated with separate input devices of the vehicle.

18. The vehicular control system according to claim 9, wherein the policy setting module is configured to input the policies from a storage device provided in a key of the vehicle.

19. The vehicular control system according to claim 18, wherein the policy setting module is configured to store the policies into the storage device provided in the key of the vehicle when driving is terminated.

* * * * *